United States Patent [19]

Csipkes et al.

[11] Patent Number: 5,671,049
[45] Date of Patent: Sep. 23, 1997

[54] SYSTEM AND METHOD FOR CONTACTLESSLY AND AUTOMATICALLY DETERMINING THE RETURN LOSS OF AN OPTICAL FIBER CONNECTOR

[75] Inventors: Andrei Csipkes, Columbia, Md.; John Mark Palmquist, Lilburn, Ga.

[73] Assignee: Lucent Technologies Inc., Murray Hill, N.J.

[21] Appl. No.: 668,220

[22] Filed: Jun. 21, 1996

Related U.S. Application Data

[63] Continuation-in-part of Ser. No. 429,999, Apr. 27, 1995, and Ser. No. 577,947, Dec. 22, 1995.

[51] Int. Cl.$^6$ .................................................. G01B 9/02
[52] U.S. Cl. ..................... 356/358; 356/345; 385/78
[58] Field of Search ........................... 356/345, 356, 356/358; 385/78, 60

[56] References Cited

U.S. PATENT DOCUMENTS

| | | |
|---|---|---|
| 4,738,507 | 4/1988 | Palmquist . |
| 4,738,508 | 4/1988 | Palmquist . |
| 4,787,698 | 11/1988 | Lyons et al. . |

OTHER PUBLICATIONS

"Checkmate F5 System Instruction Manual," Oyokoden Lab Co., Ltd. (at least as early as 1991).

"Norland Fiber Interferometer," Norland Products Inc., New Brunswick, NJ (1992).

"ZX-1 Zoom Interferometers," Direct Optical Research Company, Phoenix, AZ (at least as early as Jan. 1995).

"TOPO-3D Quick Tour Manual," Wyko Corporation, Tucson, AZ., Ltd. (Feb. 1990).

Norland, Eric A., "Defining and Measuring Physical Parameters of PC Polished Connectors," The 10th Annual National Fiber Optic Engineers Conference, San Diego, CA, Jun. 12-16, 1994, pp. 259-265.

Harding, Kevin et al., "Light Engineering for Machine Vision: Techniques and Applications," Part 1 and Part 2, Mar. 2-3, 1994, Ann Arbor, Michigan, Manufacturing Engineering Certification Institute sponsored by SME.

*Primary Examiner*—David C. Nelms
*Assistant Examiner*—Robert Kim

[57] ABSTRACT

A return loss determination system contactlessly and automatically determines a product-to-product return loss of an optical fiber connector having a domed optical fiber termination endface (i.e., an endface having an optical fiber and a surrounding support ferrule). The return loss determination system includes (a) an undercut/protrusion (U/P) inspection system for determining a U/P parameter corresponding with an offset of the fiber relative to a curvature of the ferrule along an axis of the fiber, (b) a dome polish eccentricity (DPE) inspection system for determining a DPE parameter corresponding with a displacement in a plane perpendicular to the axis between a curvature center of the curvature and a fiber center of the fiber, (c) a curvature radius (CR) inspection system for determining a CR parameter corresponding with a radius of the curvature relative to the curvature center, (d) a discontinuity inspection system for determining a discontinuity parameter to quantify surface discontinuities in the fiber, and (e) a return loss evaluation system for determining a return loss of the connector based upon the parameters.

25 Claims, 17 Drawing Sheets

SYSTEM AND METHOD FOR CONTACTLESSLY AND AUTOMATICALLY DETERMINING THE RETURN LOSS OF AN OPTICAL FIBER CONNECTOR

This document is a continuation-in-part (CIP) of the following commonly assigned U.S. patent applications: "Automatic Inspection System and Method for Contactlessly Measuring the Disparity Between Two Surfaces," filed Apr. 27, 1995, and assigned Ser. No. 08/429,999 still pending; and "Surface Analysis System and Method," filed Dec. 22, 1995, and assigned Ser. No. 08/577,947 still pending.

FIELD OF THE INVENTION

The present invention generally relates to fiber optics and connectors, and more particularly, to a system and method for contactlessly and automatically determining return loss of an optical fiber connector having a domed optical fiber termination endface.

BACKGROUND OF THE INVENTION

In the field of fiber optics, return loss is defined as the difference between the optical power transmitted in one direction through an optical fiber and the reflected power that flows in the opposite direction caused by reflection at the interface between one connector at the end of the optical fiber and a mating connector. It is normally expressed in decibels (dB) and calculated as follows: return loss $=-10*\log_{10}(P_{reflected}/P_{input})$. Return loss requirements for connectors typically varies from 40 to 60 dB in the industry.

The current standard method of measuring return loss requires the connection of a power source to a reference end equipped with an optical splitter to enable monitoring of the reflected power using an optical power meter. This method is accepted in the industry, but it is labor intensive and consumes expensive reference jumpers. Further, the results vary significantly with the condition of the reference jumper. Hence, this methodology is not well suited for full automation in an assembly line.

SUMMARY OF THE INVENTION

An object of the present invention is to overcome the inadequacies and deficiencies of the prior art as described previously in the background section.

Briefly described, the invention provides a system and method for contactlessly and automatically determining a return loss of an optical fiber connector having a domed optical fiber termination endface (i.e., an endface having an optical fiber and a domed surrounding support material, referred to herein as the ferrule). The return loss determination system includes (a) an undercut/protrusion (undercut or protrusion; U/P) inspection system for determining a U/P parameter corresponding with an offset of the fiber relative to a curvature of the ferrule along an axis of the fiber, (b) a dome polish eccentricity (DPE) inspection system for determining a DPE parameter corresponding with a displacement in a plane perpendicular to the axis between a curvature center of the curvature and a fiber center of the fiber, (c) a curvature radius (CR) inspection system for determining a CR parameter corresponding with a radius of the curvature of the domed surface, (d) a discontinuity (D) inspection system for determining a D parameter to quantify surface discontinuities in the fiber, and (e) a return loss evaluation system for determining a return loss of the connector based upon the parameters. The predicted return loss assumes product-to-product testing as specified by national and international standards, including those promulgated by the TIA and IEC.

In the preferred embodiment, the return loss is used to classify the termination as bad, good, or very good. If the return loss is less than about 40 decibels (dB) as determined by the system, then the termination is concluded as "bad." If the return loss is between 40 and 50, then the return loss is considered indefinite, and the measurement should be retaken and/or another type of return loss measurement should be employed. If the return loss is between 50 and 60 dB, then the termination is classified as "good." Moreover, If the return loss is greater than about 60 dB, then the termination is deemed to be "very good." The preferred and more specific construction of the aforementioned systems is set forth hereafter.

The U/P inspection system preferably comprises (1) a first scope with a first interferometer; (2) a camera coupled to the interferometer; and (3) a first machine vision system connected to the camera for receiving a first image of the domed combination, the machine vision system configured to determine the disparity based upon an offset between the fringe in a fiber image region representing the fiber and the fringe in a ferrule image region representing the ferrule. Using the forgoing components, the U/P system determines the U/P parameter corresponding with a disparity of the fiber relative to a curvature of the ferrule along an axis of the fiber.

The DPE inspection system preferably comprises (1) a second scope with a second interferometer; (2) a camera connected to the second scope; (3) a second machine vision system for receiving a second image of the domed combination, the machine vision system configured to identify a fiber center of the fiber, to fit an equation to the fringe, to identify a fringe center based upon the equation, and to determine the DPE parameter based upon a displacement between the fiber center and the fringe center. Using the foregoing components, the DPE inspection system determines the DPE parameter corresponding with a displacement in a plane perpendicular to the axis between a curvature center of the curvature and a fiber center of the fiber.

The CR inspection system preferably comprises (1) a third scope with a third interferometer; (2) a camera connected to the third scope; (3) a third machine vision system for receiving a third image of the domed combination, the machine vision system configured to determine a spacing between fringes and to determine the curvature radius based upon the spacing. Using the foregoing components, the CR inspection system determines a curvature radius parameter corresponding with a radius of the curvature relative to the curvature center.

The discontinuity inspection system preferably comprises (1) a fourth scope; (2) a camera connected to the fourth scope; (3) a fourth machine vision system for receiving a fourth image of the domed combination, the machine vision system configured to locate a discontinuity in the endface from the image by scanning through pixel intensities in the image, configured to weight the discontinuity based upon a location of the discontinuity relative to a center of the endface, and configured to determine the DPE parameter based upon the weight. The discontinuity inspection system determines a discontinuity parameter to quantify surface discontinuities in the fiber.

The return loss evaluation system is connected to the first through fourth machine vision systems and essentially determines the return loss of the connector based upon the parameters.

The invention can also be broadly viewed as providing a novel methodology for contactlessly and automatically classifying return loss of an optical fiber connector having a domed combination of an optical fiber and a surrounding support ferrule. The method can be summarized as follows: (a) determining an undercut/protrusion parameter corresponding with an offset of the fiber relative to a curvature of the ferrule along an axis of the fiber; (b) determining a dome polish eccentricity parameter corresponding with a displacement in a plane perpendicular to the axis, the displacement being between a curvature center of the curvature and a fiber center of the fiber in the plane; (c) determining a curvature radius parameter corresponding with a radius of the curvature relative to the curvature center; (d) determining a discontinuity parameter to quantify surface discontinuities in the fiber; and (e) determining a return loss of the connector based upon the parameters.

The invention has numerous advantages, a few of which are delineated hereafter, as merely examples.

An advantage of the invention is that it enables fully automatic measurement of the return loss of an optical fiber connector with an accuracy of about ±5 dB for a return loss of less than 58 dB and ±2 dB for a return loss of greater than 58 dB.

Another advantage of the invention is that it enables measurement of the return loss associated with an optical fiber connector without consuming expensive reference jumpers.

Another advantage of the invention is that return loss of connectors can be measured with repeatability and without dependence on the condition of a reference jumper, as in the prior art.

Another advantage of the invention is that it enables very fast measurement of the return loss of an optical fiber connector. This feature makes the invention appropriate for a fully automated assembly line.

Other objects, features, and advantages of the present invention will become apparent to one with skill with in the art of applying examination of the following drawings and detailed description. It is intended that all such additional features and advantages be included herein within the scope of the present invention, as is defined in the claims.

BRIEF DESCRIPTION OF THE DRAWINGS

The present invention can be better understood with reference to the following drawings. The drawings are not necessarily to scale, emphasis instead being placed upon clearly illustrating principles of the present invention. Furthermore, like reference numerals designate corresponding throughout the several views.

FIGS. 4A–4C show various images generated by the U/P inspection system of FIG. 3; particularly, FIG. 4A shows an image that indicates that the fiber and termination ferrule have conforming endfaces; FIG. 4B shows an image that indicates that the fiber is undercut relative to the termination ferrule; and FIG. 4C is an image that indicates that the fiber is protruding outwardly from the termination ferrule;

DETAILED DESCRIPTION OF THE PREFERRED EMBODIMENT

Figure 1:
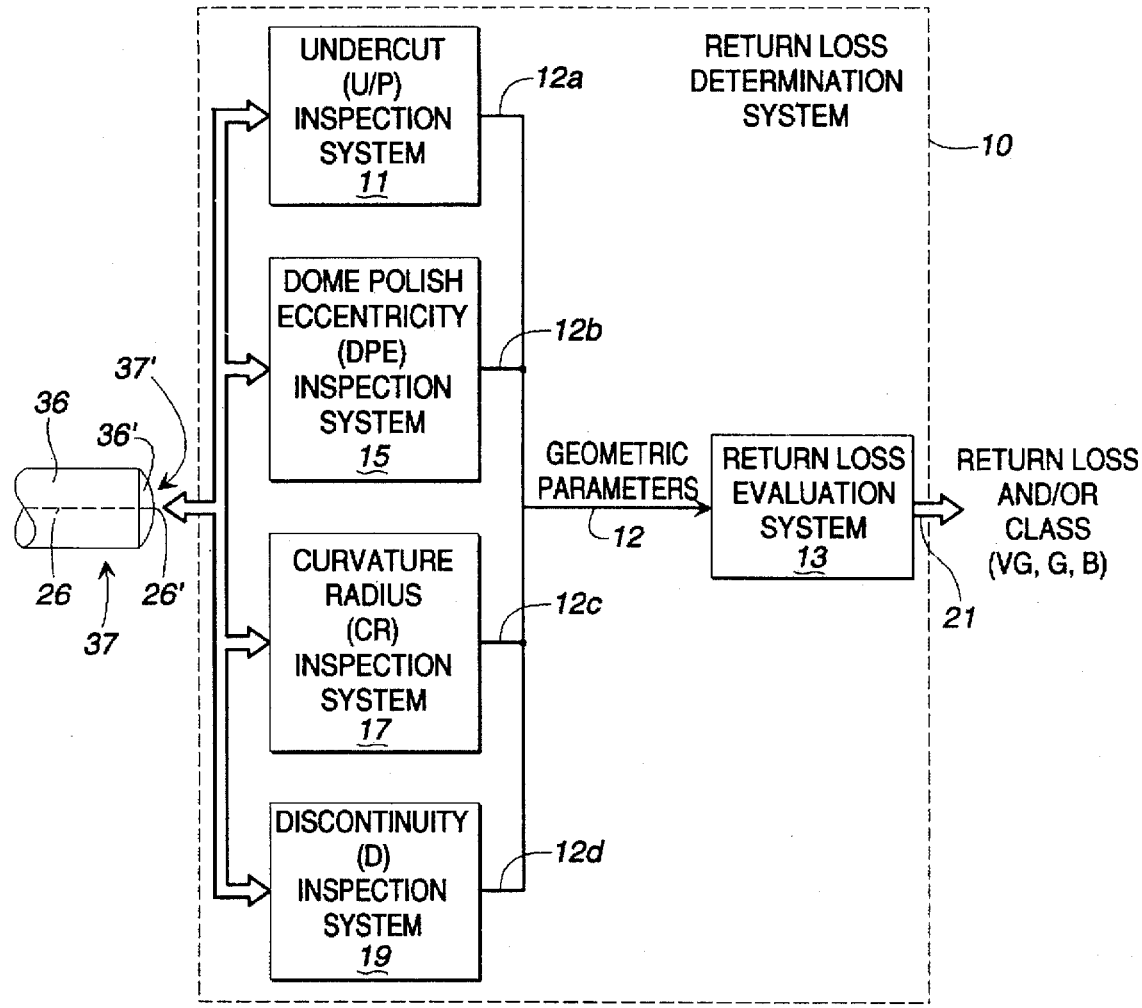
FIG. 1 is a block diagram showing the return loss determination system of the invention.

The return loss determination system 10 and associated methodology of the invention is shown in FIG. 1. Generally, the return loss determination system 10 contactlessly and automatically classifies the return loss of an optical fiber termination 37 that can be disposed in a connector. The termination 37 has a fiber 26 and surrounding ferrule 36. The fiber 26 and surrounding ferrule 36 have respective endfaces 26', 36'. Moreover, the termination endface that is defined by the endfaces 26', 36' is domed.

An undercut/protrusion (U/P) inspection system 11 automatically and contactlessly measures a U/P parameter associated with the termination endface 37' and concerning the disparity between the endfaces 26', 36'. The system 11 forwards the U/P parameter 12a to a return loss evaluation system 13 as indicated by reference arrow 12. The construction and operation of the U/P inspection system 11 will be further described hereinafter with respect to FIGS. 2–5.

A dome polish eccentricity (DPE) inspection system 15 automatically and contactlessly measures a DPE parameter associated with the endface 37' and forwards the DPE parameter 12b to the return loss evaluation system 13, as indicated by reference arrow 12. The DPE parameter 12b represents a displacement between a curvature center of the endface curvature and a fiber center associated with the endface 37'. The construction and operation of the DPE inspection system 15 will be further described hereinafter relative to FIGS. 6–8.

A curvature radius (CR) inspection system 17 automatically and contactlessly measures a CR parameter 12c associated with the endface 37' and forwards the CR parameter 12c to the return loss evaluation system 13, as indicated by reference arrow 12. The CR parameter 12c is essentially a radius of the endface curvature relative to the endface center. The CR inspection system 17 will be further described hereinafter with respect to FIGS. 7 and 9.

A discontinuity inspection system 19 contactlessly and automatically measures a discontinuity (D) parameter 12d associated with the endface 37' and forwards the D parameter 12d to the w/urn loss evaluation system 13, as indicated by reference arrow 12. The D parameter 12d essentially quantifies surface discontinuities in the surface of the termination endface 37'. The discontinuity inspection system 19 will be further described hereinafter relative to FIGS. 10–14.

The return loss evaluation system 13, which is connected to the systems 11, 15, 17, 19 for receiving the respective U, DPE, CR, D parameters 12a–12d, is configured to assimilate the parameters and determine a return loss based upon the assimilation of the parameters. In the preferred embodiment, the return loss is used to classify the termination endface 37' as bad, good, or very good. If the return loss is less than about 40 decibels (dB) as determined by the system, then the termination is concluded as bad. If the return loss is between 40 and 50, then the return loss is considered indefinite, as the uncertainty is high, and the measurement should be retaken and/or another type of return loss measurement should be employed. If the return loss is between 50 and 60 dB, then the termination endface 37' is classified as good. Moreover, if the return loss is greater than about 60 dB, then the termination endface 37' is deemed to be very good. The return loss class 21 in the preferred embodiment identifies one of three ranges. In the preferred embodiment, when a termination endface 37' of a connector is tested, a message indicating the return loss and/or one of the messages "bad," "good," or "very good" can be communicated to the user or an automated system by the return loss evaluation system 13. This information permits the user or an automated system to reject or accept the termination 37.

I. UNDERCUT/PROTRUSION (U/P) INSPECTION SYSTEM

The U/P inspection system 11 of the preferred embodiment will now be described with reference to FIGS. 2–5. In addition, the U/P inspection system 11 of the preferred embodiment is also described in co-pending application entitled, "Automatic Inspection System and Method for Contactlessly Measuring the Disparity Between Two Surfaces," filed Apr. 27, 1995, and assigned Ser. No. 08/429,999, the disclosure of which is incorporated herein by reference as if set forth in full hereinbelow.

Figure 2:
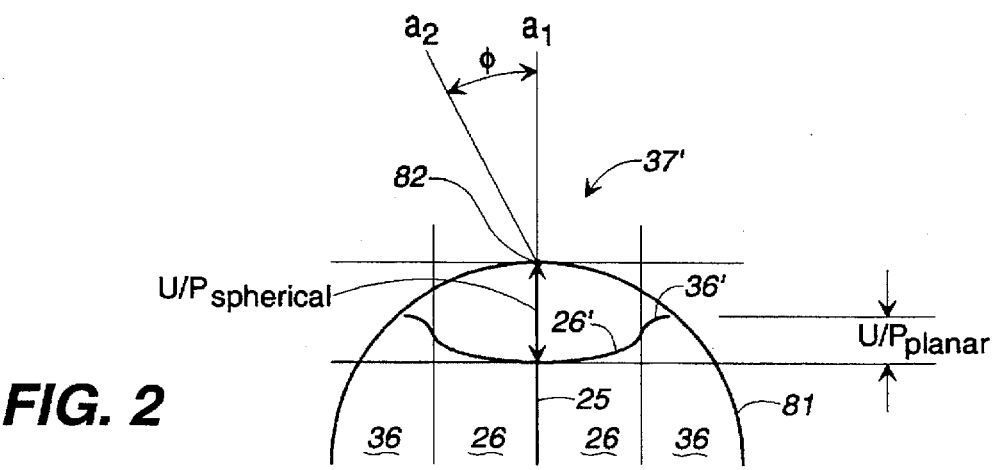
FIG. 2 is a graph showing a possible methodology for measuring a spherical undercut/protrusion ($U/P_{spherical}$) parameter and a planar undercut/protrusion ($U/P_{planar}$) parameter of an optical fiber.

The manner in which the disparity or discontinuity between two surfaces is measured by the U/P inspection system will now be described with reference to FIG. 2. FIG. 2 schematically shows a cross-section of the optical fiber termination endface 37'. The circular curvature 81 in FIG. 2 represents the 2D cross-section of the desired 3D domed termination endface 37'. The U/P parameter 12a, which will be called the spherical undercut or spherical protrusion ($U/P_{spherical}$) is defined as the displacement between the curve 81 and the fiber 26 along a longitudinal axis $a_1$ that runs longitudinally through the center of the fiber 26 (and fiber core 25).

Note that FIG. 2 also shows a distance between the top of endface 36' and the bottom of endface 26', which is referred to herein as the planar undercut/protrusion ($U/P_{planar}$). The $U/P_{planar}$ is computed and is utilized in the ultimate determination of the return loss, as will be further described later hereinafter.

If the endface 26' of the fiber 26 is recessed below the adjacent endface 36' of the surrounding termination plug 36, as is shown in FIG. 2, then the fiber 26 is said to be "undercut" with respect to the termination endface 79. In contrast, If the endface 26' of the fiber 26 protrudes outwardly from the endface 36' of the plug 36 (i.e., endface 26' resides above curve 81 in FIG. 2), then the fiber 26 is said to exhibit "protrusion" with respect to the termination endface 79. For purposes of simplicity, only the undercut configuration is shown in FIG. 2, but it should be understood that the methodology for measuring the U/P parameter 12a applies also to the protrusion configuration.

In either of the aforementioned scenarios, the U/P parameter 12a is automatically measured by the system of the present invention and can be used for quality control or other purposes. In this regard, if the U/P parameter 12a falls within an acceptable threshold, then the termination endface 79 is adequate. Otherwise, if the U/P parameter 12a is too great and falls above the threshold, then the termination endface 79 is unacceptable and the associated termination 37 is inadequate and should be discarded. Furthermore, the quantitative data generated by the system from a sequence of terminations 37 processed by a given machine, process, or operator may then be used to measure the stability of the machine, process, or operator, or to predict when the machine, process, or operator is out of control.

The U/P inspection system 11 can be used to determine the relative disparity between two surfaces, particularly the relative disparity between an optical fiber 26 and its adjacent concentrically surrounding termination plug 36.

In architecture, the U/P inspection system 11 comprises a measurement apparatus 91 that runs longitudinally along an axis $a_2$ for contactlessly observing the relevant target surfaces 26', 36' and generating associated data and a machine vision system 92 in a computer for controlling and monitoring the measurement apparatus 91.

The measurement apparatus 91 comprises an optical objective 96 that interfaces light with the relevant target surfaces 26', 36'. The objective 96 resides along the axis $a_2$ and is pointed toward a target 82 (FIG. 2), where axes $a_1$, $a_2$ intersect, in order to capture an image of endface 79 (includes fiber endface 26' and termination endface 36'). In the preferred embodiment, the objective 96 is a model MPlan 20DI 323270, which is commercially available from Nikon, Inc., Japan.

A focus adjustment mechanism 97 supports the objective 96 and is adapted to move the objective 96 along the axis $a_2$. A suitable commercially available focus adjustment mechanism 97 is a model P721.00 piezoelectric element, which is manufactured by Physik Instrumente, Germany. The foregoing piezoelectric element can selectively move the objective 96 a distance of about 100 μm (with a resolution of 3 nm) based upon a closed loop control that receives a voltage input of between 0 and 100 volts. When 0 volts is supplied to the piezoelectric element 97, the objective 96 is maintained at its greatest distance (is completely retracted) from its target along axis $a_2$, whereas when 100 volts is supplied to the piezoelectric element 97, the objective 96 is the closest distance (full extension) to the target along axis $a_2$.

An interferometer 98 supports the piezoelectric element 97 and is situated along the axis $a_2$. A suitable interferometer is the model ME-3000, which is manufactured by and commercially available from Micro Enterprises, Inc, U.S.A. The interferometer 98 has an internal light source 98a and an internal light reflection apparatus 98b. It is known in the art that the interferometer 98 can be used to measure very small distances and thicknesses using known wavelengths of light. Generally, in the interferometer 98, a beam of light from the light source 98a is separated into two opposing beam parts by partial reflections at the reflection apparatus 98b. One beam part is projected against the target, returns to the interferometer 98, and is reunited with the other beam part at the reflection apparatus 98b. Because the beams have traversed different optical paths, the two components produce interference in the image of the target. Furthermore, the interference can be utilized to measure very small distances or thicknesses.

Figure 3:
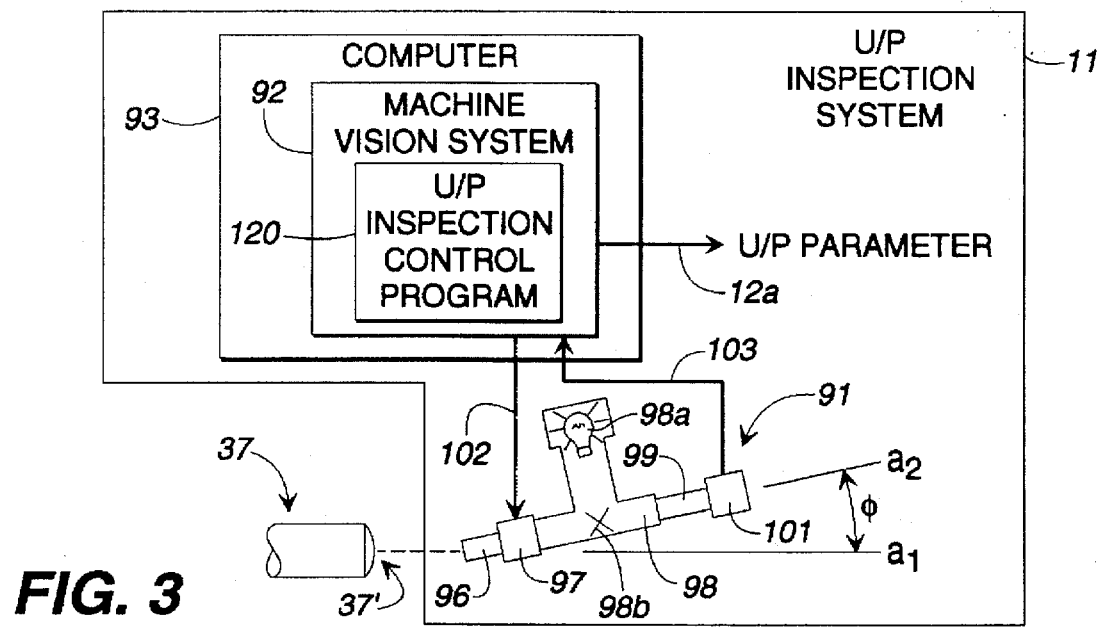
FIG. 3 is a block diagram showing a possible implementation of the U/P inspection system of FIG. 1 for measuring the U/P parameter of FIG. 2.

The objective 96 and the interferometer 98 are mounted so that the combination views the target at an angle φ. Said another way, the combination is mounted so that the axes $a_1$, $a_2$ intersect at an angle φ, as illustrated in FIGS. 2 and 3. In the preferred embodiment, the angle φ about 3°, but can be varied at least between the range of approximately 2°–9°. The angle φ of inclination enables a fringe pattern 112 (comprised of fringes, or bands; see FIGS. 4A–4C) to be superimposed over the image generated by the interferometer and viewed by the objective 96. It should be noted that prior art uses of an interferometer 98 do not position the target image at an angle φ and do not produce a fringe pattern 112 having a plurality of fringes 113 as in accordance with the present invention. In fact, prior art uses produce interference patterns in the form of a bull's eye.

A video adaptor 99 is mounted to the interferometer 98 along the axis $a_1$ and includes a combination of one or more optical lenses that allows for tuning of an image projected from the interferometer 98. In essence, the video adaptor 99 permits clarity focusing of interferometric fringes associated with the image. In the preferred embodiment, the video adaptor 99 also magnifies the image from the interferometer 98 by 25×. Once the measurement apparatus 91 is mounted, the lenses associated with the video adapter can be fixedly arranged. A suitable video adaptor is a model Nikon 30255, which is commercially available from Nikon, Inc, Japan.

A camera 101 is secured to the video adaptor 99 and receives and encodes images projected to it from the video adaptor 99 and ultimately from the interferometer 98. The camera 101 may be, for example but not limited to, a charge-coupled device (CCD), such as a model KPM1, which is commercially available from Hitachi, Japan. The CCD camera 101 comprises a pixel array for receiving light. Moreover, the pixel array encodes the image by generating analog voltage signals proportional to the intensity of light at each pixel of the CCD, as is well known in the art.

The machine vision system 92 controls the piezoelectric element 97 via a piezo control signal 102, which in the preferred embodiment is a voltage signal in the range of between 0 and 100 volts, in order to cause the piezoelectric element 97 to move the objective 96 along the axis $a_2$. Further, the machine vision system 92 receives the analog voltage signals 103 from the camera 101 that are used by the machine vision system 92 to construct a digital image in a frame buffer (not shown). The image can be any suitable size, such as 512×480 pixels, for driving the output device 93, and a pixel value, or intensity, corresponding with each pixel in the image can exhibit any one of 256 possible values.

The machine vision system 92 can be implemented with any suitable logic, processing mechanism(s), or combination thereof. A suitable machine vision system 92 a model ITI ITEX OFG (overlay frame grabber) image processing card that is commercially available through Microdisc, Inc., U.S.A. Furthermore, in the preferred embodiment, the machine vision system 92 further includes an amplifier for producing the piezo control signal 102 within the aforementioned voltage range of 0–100 volts from control signals received from the NCR 3333 computer. A suitable amplifier is a model E860.10 amplifier manufactured by Physik Instrumente, Germany.

In the preferred embodiment, the computer 93 is a Gateway 2000 computer, which is commercially available from Gateway Corp., USA, equipped with a machine vision processor.

The U/P inspection system 11 of FIG. 3 may be mounted in a commercial-scale optical fiber manufacturing facility for monitoring the quality control of fiber optic terminations 37. The terminations 37 could be disposed in view of the objective 96 by manual human manipulation, or alternatively, by an automated mechanism. As an example, the termination 37 could be situated upon a conveyor, along with perhaps many other terminations 37, and moved in front of the objective 96 so that a measurement can be automatically made by the U/P inspection system 11.

Figure 4A:
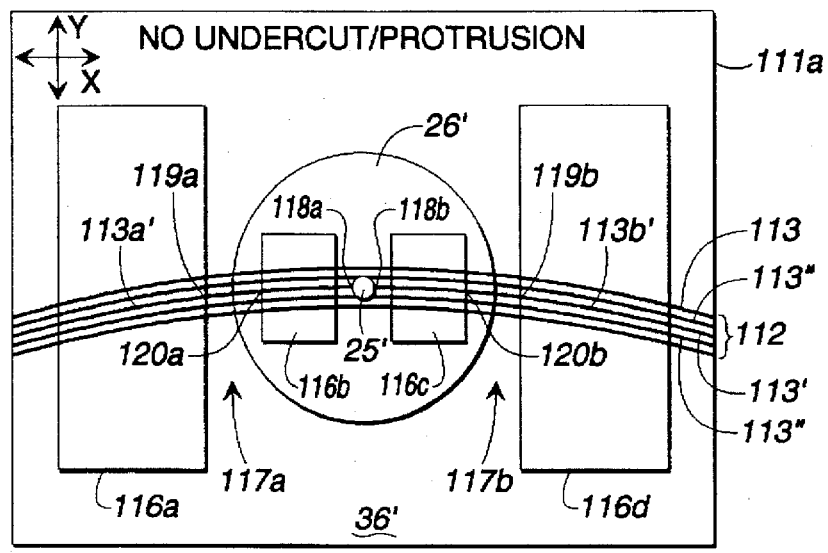
Figure 4B:
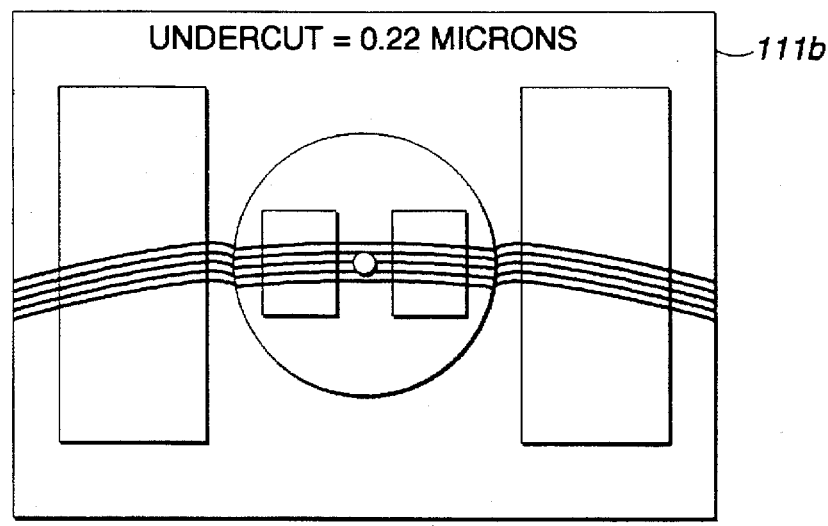
Figure 4B:
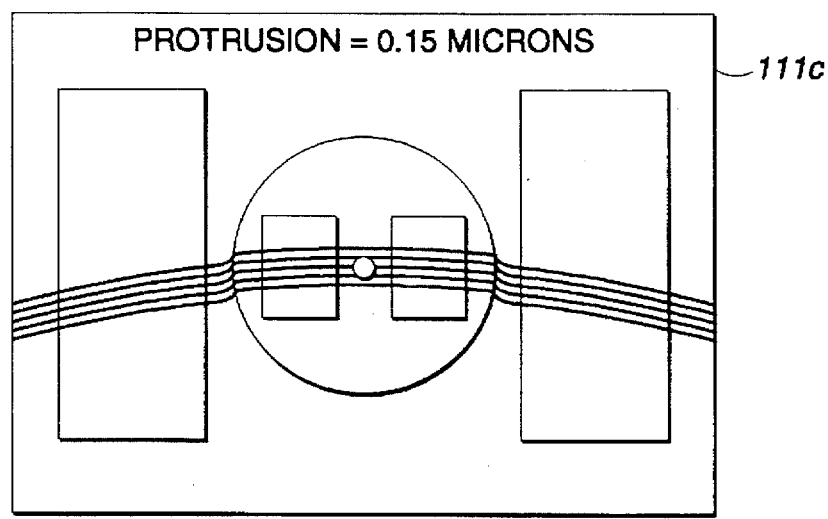

FIGS. 4A through 4C show respective images 111a–111c that can be generated by the machine vision system 92 (FIG. 3) and, if desired, driven to a display 93 in the preferred embodiment. The features illustrated in the images 111a–111c are merely an example of the type of information that can be provided to a user. During proper operation, the images 111a–111c preferably show at least a portion of the termination endface 79, i.e., the fiber endface 26' and at least part of the surrounding termination plug endface 36'. Moreover, the images 111a111c show a pattern 112 of generally horizontal, dark, interferometric fringes, or bands, 113 passing over both the fiber endface 26' and at least part of the plug endface 36'. In these figures, as an example and for simplicity, only five fringes 113 are shown in the pattern 112. However, more than five fringes 113 can in fact be generated by the measurement apparatus 91 (FIG. 3).

The location of the interferometric pattern 112 within the expanse of the images 111 is a function of the distance between the objective 96 (FIG. 3) and the target 82 (FIG. 2).

The spacing between the fringes 113 is a function of (a) the angle φ of inclination of the combination of the objective 96 and interferometer (FIG. 3) relative to the target 82, which is preferably fixed at approximately 3° in the preferred embodiment and (b) the light wavelength from interferometric light source 98a.

The curvature of the fringes 113 within the images 111 is a function of the curvature of the termination endface 79

(FIG. 2). In other words, the radius of curvature of the termination endface 79 is directly proportional to the radius of curvature of the fringes 113 in the images 111.

Significantly, depth information and particularly the U/P parameter 12a (FIG. 2) can be visualized and quantitatively determined from one or more of the fringes 113 within the pattern 112 by analyzing interference in the form of a displacement in the one or more fringes 113. More specifically, a visual change in the continuity of the fringes 113 as the fringes 113 run horizontally across the image 111 indicates a change in the U/P parameter 12a. FIG. 4A illustrates the desired ideal scenario when the core 26 and the surrounding plug 36 are continuously domed and conform to the curve 81 (FIG. 2). FIG. 4B illustrates the scenario where the fiber 26 is undercut with respect to the plug 36. As is shown in FIG. 4B, the bands 112 are offset, or displaced, slightly downwardly in the region between the plug 36 and the fiber 26. FIG. 4C illustrates the scenario where the fiber 26 protrudes outwardly from the endface 36' (FIG. 2) of the plug 36. As is shown in FIG. 4C, the fringes 113 are again deflected as in the region between the plug 36 and the fiber 26. However, unlike in FIG. 4B, the fringes 113 in FIG. 4C are displaced slightly upwardly in the image 111c between the plug 36 and the fiber 26.

In the scenarios of FIGS. 4B and 4C, the extent of undercut and protrusion respectively is determined automatically and precisely by the U/P inspection system 11 (FIG. 3) by measuring the distance of displacement of any fringe 113, while taking into account the wavelength of the light from light source 98a and the fixed angle $\phi$, which dictates the spacing between the fringes 113.

In the preferred embodiment, the interferometer 98 has a light source 98a that generates white light ($\lambda \cong 600$ nm) that is projected against the target 82. Because white light is utilized to generate the images 111a–111c, the fringe pattern 112 will have fringes 113 with varying degrees of darkness intensity (the bright bands generally do not exhibit varying intensities). In order to minimize adverse effects resulting from noise, the U/P inspection system 11 (FIG. 3) causes a darkest fringe 113' of the pattern 112 to pass through the center of the fiber endface 26' (as well as core endface 25') and the disparity measurements are based substantially upon the darkest fringe 113'. Furthermore, when white light is utilized, the fringes 113 reside approximately 300 nm apart at the prescribed angle $\phi=3°$.

In order to further minimize the adverse effects resulting from noise and in order to optimize the speed of the machine vision system 92 (FIG. 3), multiple zones 116a–116d are implemented. The zones 116a–116d define the regions of the images 111a–111c where data is analyzed and used in the calculations concerning the determination of the U/P parameter 12a. In the preferred embodiment, the zones 116a–116d are shown to the user by the display 93 along with information regarding curves within the respective zones 116a–116d.

In addition to the features illustrated in FIGS. 4A–4C, in the preferred embodiment, the images 111 further include specific numerical information regarding the U/P parameter 12a, for instance and obviously not limited to, "NO UNDERCUT/PROTRUSION" as in FIG. 4A, "UNDERCUT=0.22 MICRONS" as in FIG. 4B, and "PROTRUSION=0.15 MICRONS" as in FIG. 4C. Moreover, obviously, the disparity information can take many suitable grammatical forms and can be spatially positioned virtually anywhere in the images 111.

Figure 5:
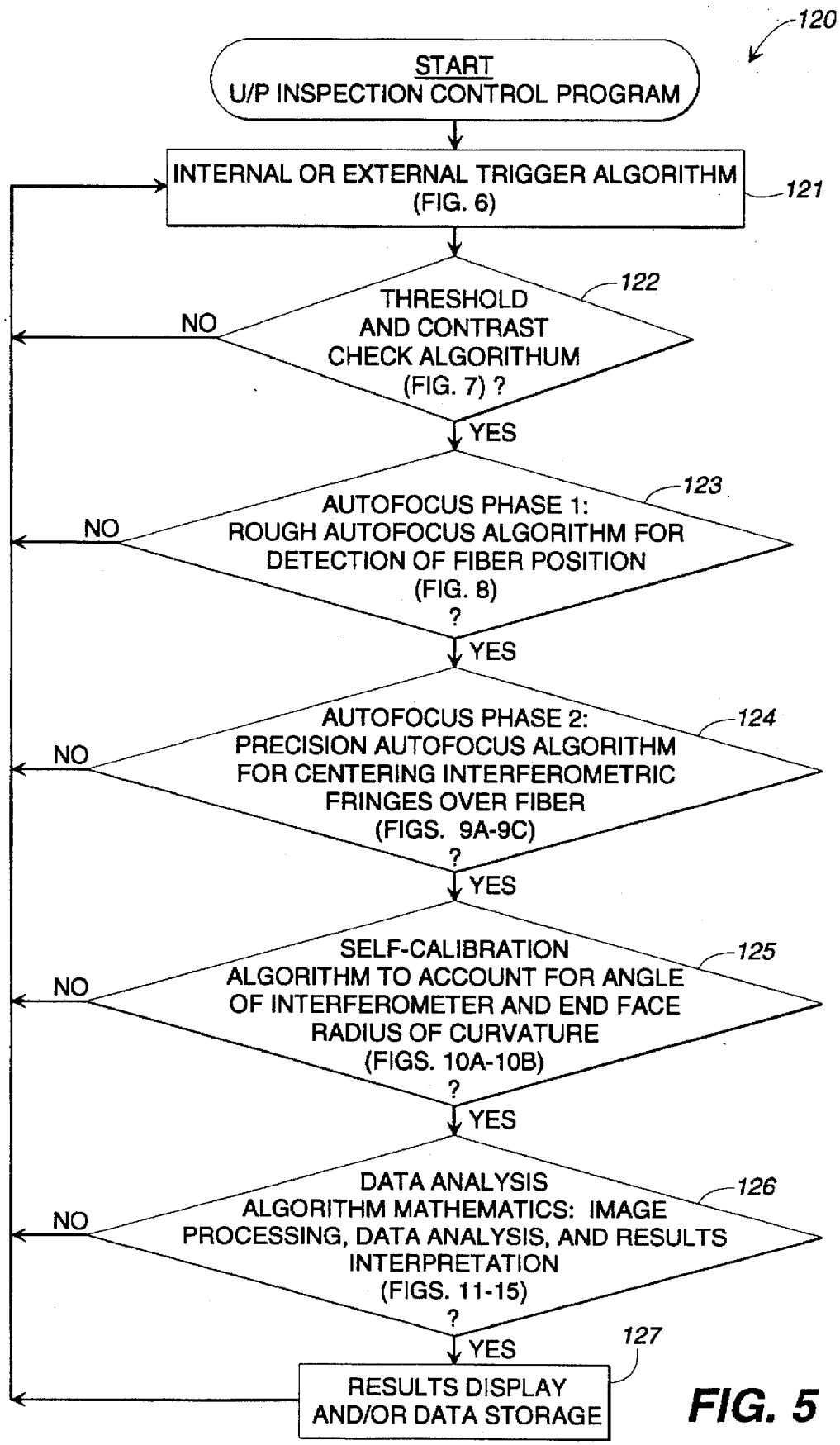
FIG. 5 is a flow chart showing a possible implementation of an U/P inspection control program that is run by the machine vision system of FIG. 3.

A high level flow chart illustrating the overall architecture and functionality of a U/P inspection control program 120 is set forth in FIG. 5. The U/P inspection control program 120 can be implemented in software, hardware, or a combination thereof. The U/P inspection control program 120 is preferably implemented via a computer program, which comprises a list of executable instructions, stored in a memory (not shown) associated with the machine vision system 92, which is a computer in the preferred embodiment, and executed by a processor (not shown) associated with the machine vision system 92.

Initially, in the U/P inspection control program 120, a trigger algorithm is employed, as set forth in flow chart block 121. Essentially, the machine vision system 92 waits to be prompted by the user to perform a disparity measurement.

A threshold/contrast check algorithm is next employed, as set forth in flow chart block 122. In general, the threshold/contrast check algorithm 122 determines whether there is enough contrast in the image 111 to find the location of the fiber 26. In this regard, the algorithm 122 compares the gray level of the background with the gray level of the fiber 26.

The U/P inspection system 11 employs a suitable autofocusing process. In the preferred embodiment, the system 11 utilizes a novel two-phase autofocus algorithm for positioning the fiber endface 26' in the center of the display image and the darkest fringe 113' over the core endface 25' of the fiber 26. The two-phase autofocus process is characterized by minimal calculations, high speed, and repeatability that far exceeds human performance. In this regard, a rough autofocus algorithm, as set forth in flow chart block 123, is implemented after the threshold/contrast check algorithm 122. The rough autofocus algorithm 123 detects the location of the fiber 26 within an image 111. The fiber 26 may not be situated in the center of the image 111 due to an imprecise support structure. Generally, in accordance with the rough autofocus algorithm 123, the piezoelectric element 97 is initialized so that the objective 96 is the furthest distance away from its target. Then, the piezoelectric element 97 is actuated by the machine vision system 92 (FIG. 3) so that the objective 96 is moved closer to its target 82 (FIG. 2). During this operation, the interferometric pattern 112 (FIGS. 4A) is moved vertically, upwardly or downwardly, across the image 111. After the pattern 112 has been vertically centered within the image 111, the pattern 112 is moved slightly away from the vertical center by a predetermined distance, and then the fiber 26 is located relative to the x,y coordinate system (FIG. 4A) of the vision system frame configuration.

Next, a precision autofocus algorithm is implemented, as set forth in flow chart block 124. The precision autofocus algorithm 124 essentially centers the interferometric fringes 113 precisely over the fiber endface 26' so that the darkest fringe 113' passes through the core endface 25' (FIG. 4A).

A self-calibration algorithm is now employed, as indicated in flow chart block 125. The self-calibration algorithm 125 determines the spacing (in pixels) between the fringes 113 that is ultimately utilized in determining the U/P parameter 12a. Significantly, the algorithm 125 accounts for changes in the angle $\phi$ of the objective 96 (FIG. 3) as well as the interferometer 98 (FIG. 3) relative to the longitudinal axis $a_1$ of the target 82 (FIG. 2), i.e., the view of the fiber endface 26' and surrounding plug endface 36'. Further, the self-calibration algorithm 125 accounts for variations in the radius of curvature of the fiber 26.

After implementation of the self-calibration algorithm 125, a data analysis algorithm is employed, as set forth in flow chart block 126. The data analysis algorithm 126 determines the U/P parameter 12a by performing image processing, data analysis, and interpretation of the data analysis. In general, a first circle is mathematically fitted to the plug endface 36' and a second circle is fitted to the fiber endface 26'. Moreover, the difference between the location of the first and second circles, as measured along a line approximately normal to the fiber endface 26' at a point that intersects the center of the fiber core 25 (i.e., as measured at the x coordinate of the fiber core center), is computed. Moreover, the U/P parameter 12a (FIG. 2) is computed based upon the aforementioned difference, the measured fringe spacing (in pixels), and the known wavelength of the interferometer light (white light in the preferred embodiment).

Finally, as indicated in a flow chart block 127, the results generated by the data analysis algorithm 126, which includes the U/P parameter 12a, can be driven to the display 93 in any suitable presentation configuration by the machine vision system 92 (FIG. 3), provided to a data storage device, and/or provided to another automated system. In the preferred embodiment, an image 111, similar to one of those shown in FIGS. 4A–4C, is generated by the machine vision system 92 (FIG. 3) and passed to the display 93 (FIG. 3).

II. DOME POLISH ECCENTRICITY (DPE) AND CURVATURE RADIUS (CR) INSPECTION SYSTEM

Figure 7:
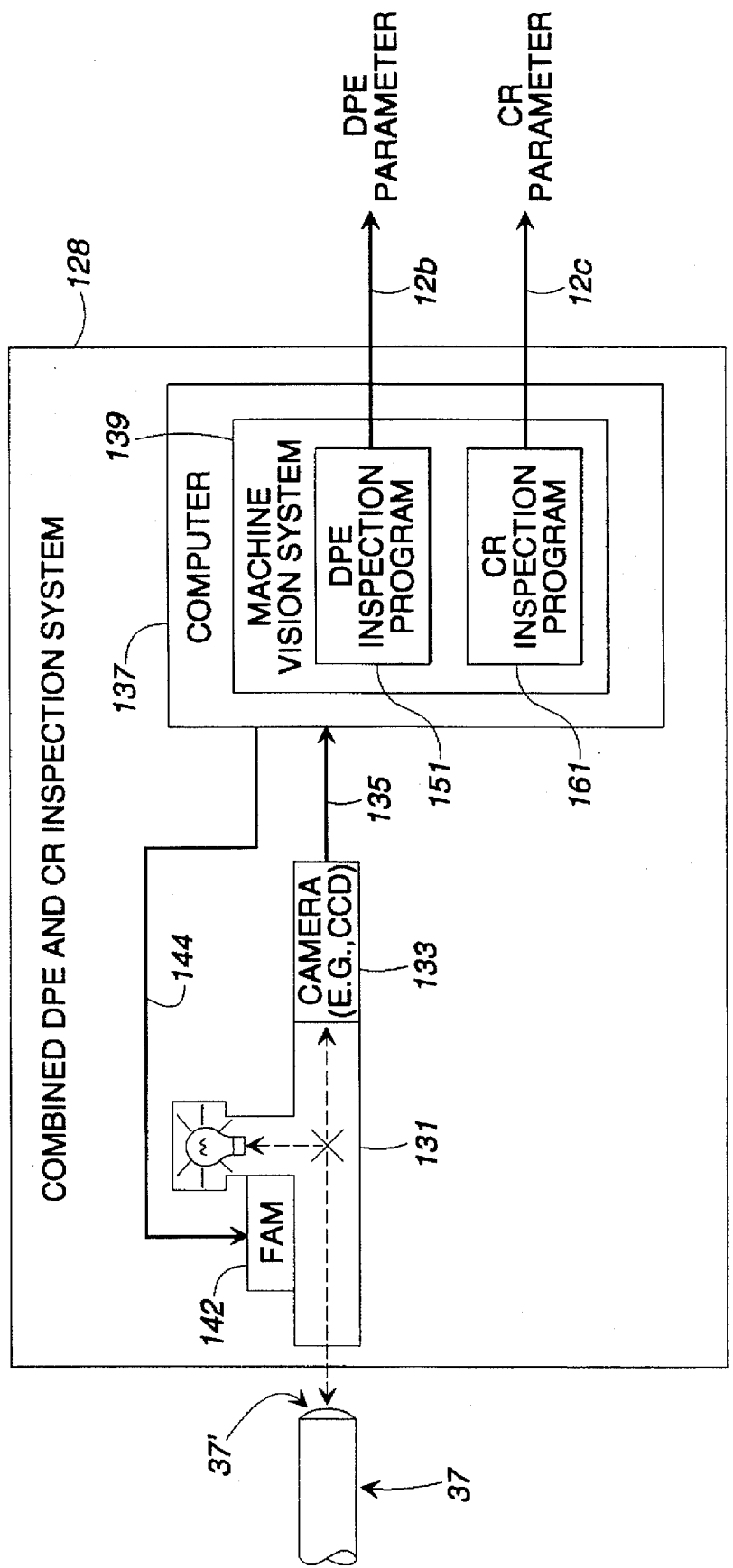
FIG. 7 is a block diagram showing a possible implementation of a combined DPE/CR inspection system of FIG. 1 for measuring the DPE of FIG. 6 and, additionally, a curvature radius (CR) parameter.

In the preferred embodiment, a combined DPE/CR inspection system 128 is utilized to measure both the DPE and CR parameters 12b, 12c. However, separate systems for determining these parameters could be implemented, as is shown in FIG. 1. With reference to FIG. 7, the combined DPE/CR inspection system 128 includes a combined scope and interferometer 131 for capturing an image of the termination endface 37' with an interferometric fringe pattern superimposed over the endface image. A camera 133, for example, a charge couple device (CCD), is connected to the interferometer 131 for encoding the captured image into an electrical signal 135, which is passed to a computer 137 having a machine vision system 139 for processing the electrically encoded image. The machine vision system 139 runs a DPE inspection program 151 for computing the DPE parameter 12b and a CR inspection program 161 for computing the CR parameter 161. These parameters 12b, 12c are output to a user or other system.

A focus adjustment mechanism (FAM) 142 is preferably associated with the scope of the interferometer 131 for enabling automatic focusing of the interferometer 131 relative to the endface 37'. The FAM 142 essentially moves the scope of the interferometer 131 axially (to and from) relative to the termination 37. The FAM 142 is controlled by the computer 137, as indicated by reference arrow 144.

A. DPE Inspection Program

Figure 6:
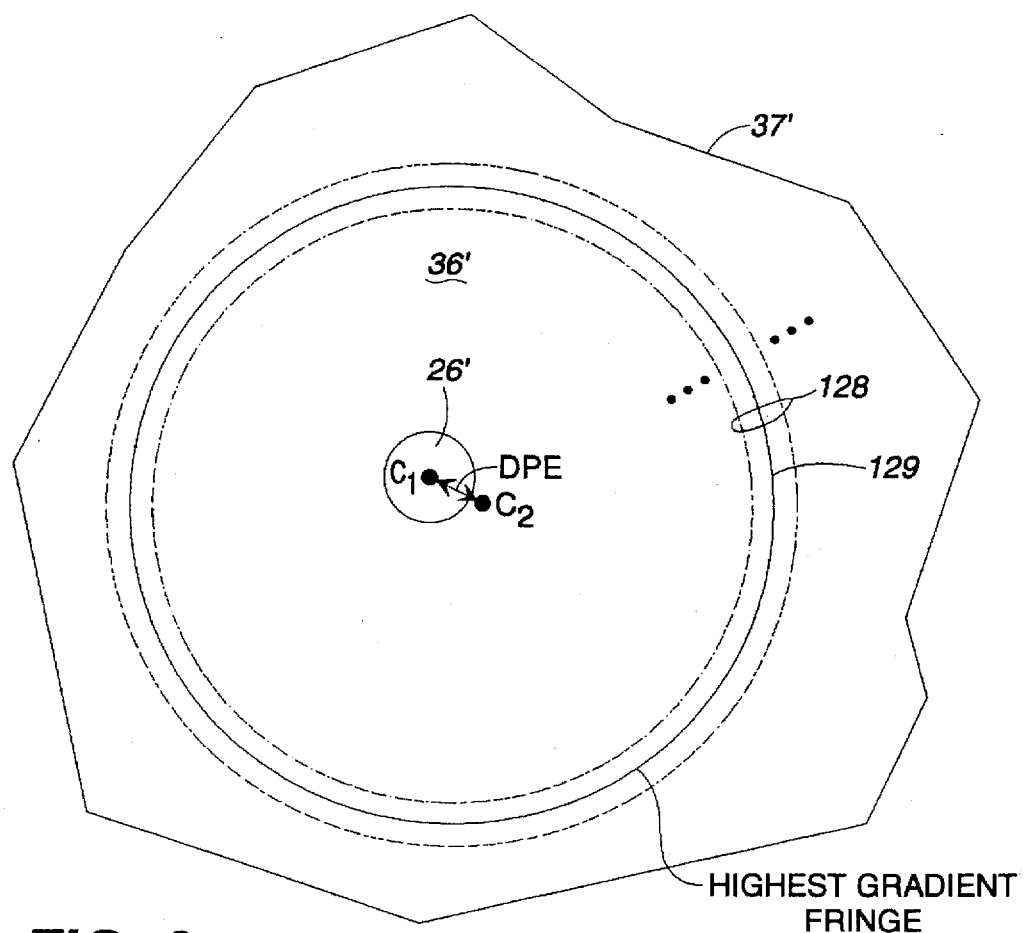
FIG. 6 is a graph showing a possible methodology for measuring a dome polish eccentricity parameter

The DPE inspection program 151 automatically determines the DPE parameter 12b (FIG. 1). FIG. 6 graphically illustrates the DPE parameter 12b. Assuming that $C_1$ is the center of the fiber endface 26' and that $C_2$ is the center of the dome associated with the endface 37', then the DPE parameter is the distance between $C_1$ and $C_2$. Said another way, the DPE parameter 12b is essentially the distance between the fiber center and the highest point on the dome of the endface 37'.

Figures 8, 9:
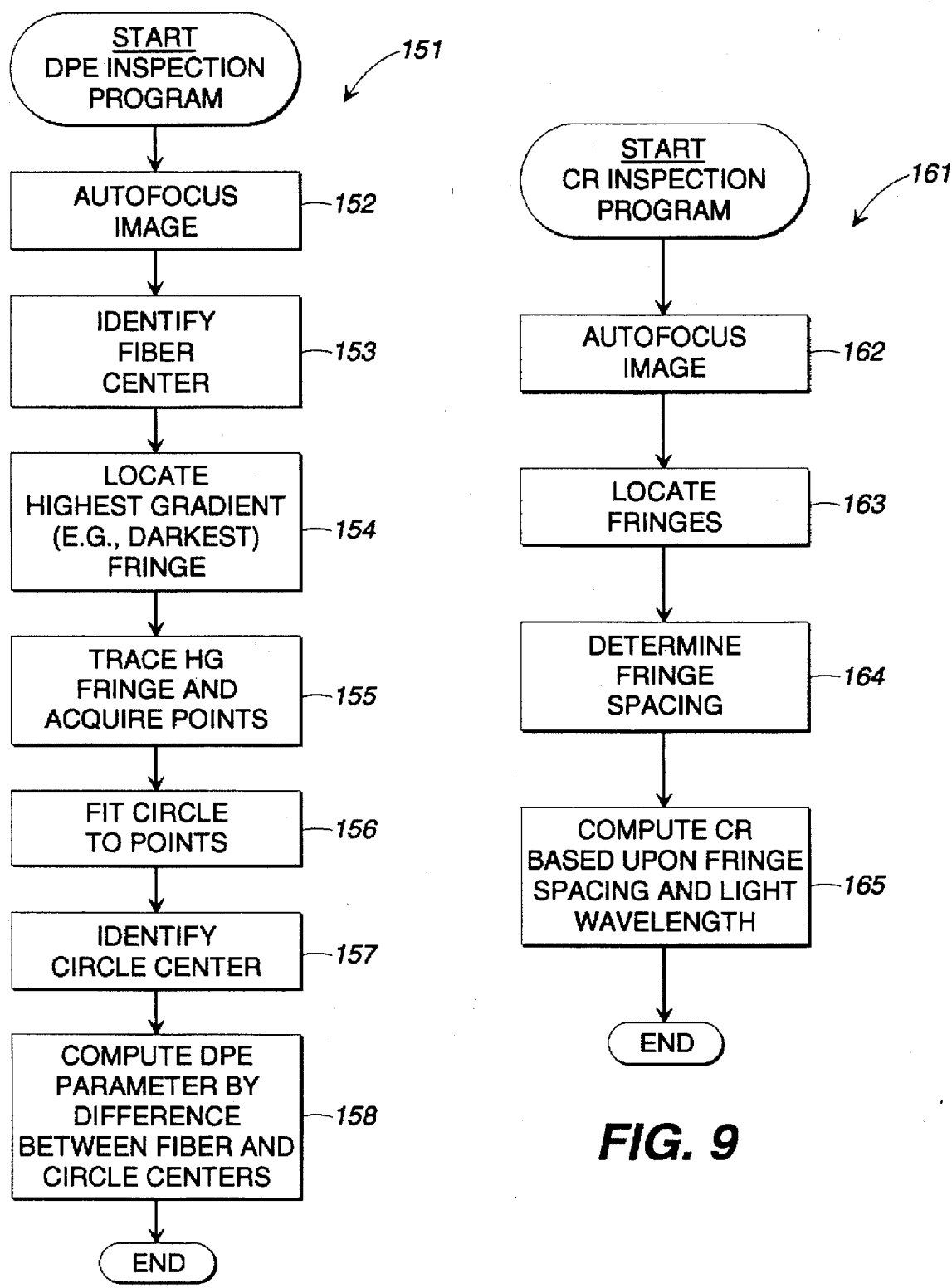
FIG. 8 is a flow chart showing a possible implementation of a DPE inspection program that is run by the machine vision system of FIG. 7 to determine the DPE parameter.
FIG. 9 is a flow chart showing a possible implementation of a CR inspection program that is run by the machine vision system of FIG. 7 to determine the CR parameter.
Figure 10:
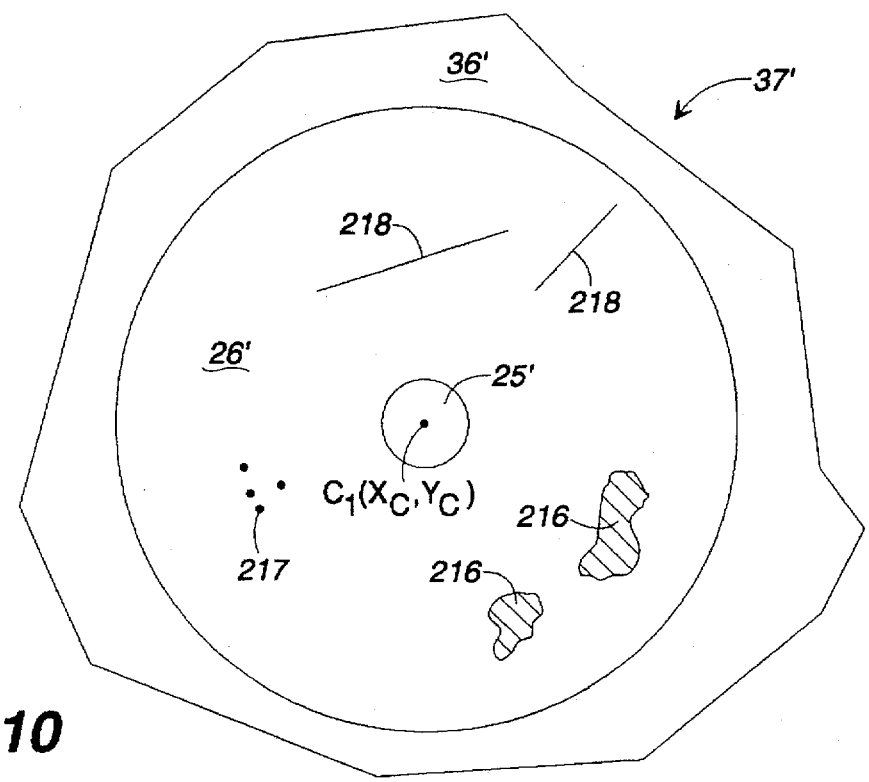
FIG. 10 is a front view of an optical fiber endface showing a possible methodology for classifying discontinuities.

The machine vision system 139 runs a DPE inspection program 151 as set forth in FIG. 8. With reference to FIG. 8, initially, the DPE inspection program 151 autofocuses the image of the endface 37' using any suitable methodology.

The autofocusing step is performed by block 152. Block 152 transfers to block 153.

Block 153 identifies the fiber center $C_1$. This is preferably accomplished using an edge tracing (or snake) algorithm, which is well known in the art. Essentially, from the last measurement, the combined DPE/CR inspection system 128 knows where to look to find the fiber endface 26' and uses the edge tracing algorithm to follow the periphery of the endface 26'. The edge tracing algorithm detects changes in pixel intensities (changes between black and white). Once the periphery of the fiber endface 26' is located, a circle is fit to the periphery and the center of the fitted circle is determined. The center of the circle corresponds to the fiber center $C_1$. After the block 153 computes the fiber center, it transfers to block 154.

Block 154 locates the highest gradient (e.g., darkest) fringe 129 (FIG. 6) of the interferometric pattern 128 (FIG. 6). This can be accomplished by tracing a line radially outwardly from the fiber center $C_1$, while examining gradients. Gradient changes will exist as the fringes in the pattern 128 are passed during the scan, with the highest gradient fringe 129 exhibiting the highest gradient. After the highest gradient fringe 129 is located, block 154 transfers to block 155.

Block 155 of the program 151 traces the highest gradient fringe and acquires points along the highest gradient fringe 129. Afterward, block 155 transfers to block 156.

Block 156 fits a circle to the previously acquired points. Block 156 transfers to block 157.

Block 157 identifies a circle center that corresponds to $C_2$ (FIG. 6). Block 157 transfers to block 158.

Block 158 computes the DPE parameter 12b by determining the distance between $C_1$ and $C_2$. It is desirable to have a DPE parameter 12b of less than about 5 microns.

B. CR Inspection Program

In the preferred embodiment, a CR inspection program 161, as illustrated by way of flow chart in FIG. 9, is used by the computer 137 (FIG. 7) to drive the machine vision system 139 (FIG. 7) to compute the CR parameter 12c (FIG. 1) associated with the termination endface 37'.

With reference to FIG. 9, initially, an autofocus routine is employed to focus the interferometer 131 relative to the endface 37'. In the preferred embodiment, the DPE and CR parameters 12b, 12c are determined substantially concurrently, and therefore, the interferometer 131 need only be focused one time. Block 162 transfers to block 163 after adequate focus has been obtained.

Block 163 locates the various fringes of the fringe pattern 128 (FIG. 6). This is preferably accomplished using gradient analysis while tracing a line along the image. Again, in the preferred embodiment, the DPE and CR parameters 12b, 12c are determined substantially concurrently, and therefore, the fringes need only be located once. Afterward, block 163 transfers to block 164.

Block 164 determines the spacing between adjacent fringes in the interferometric pattern 128. In the preferred embodiment, the program 161 locates six fringes and groups them in pairs of two to determine several spacings. Block 164 transfers to block 165.

Block 165 computes the CR parameter 12c based upon the fringe spacing(s) and the light wavelength corresponding with the interferometer 131 (FIG. 7). Generally, the distance along the optical axis between adjacent fringes is equal to half the light wavelength, or distance=½. Furthermore, in the preferred embodiment, several CR parameters 12c are computed based upon the several spacings that were measured by block 164 to produce a histogram of CR parameters 12c. From the histogram, a most probable CR parameter 12c is selected. The concept of utilizing a histogram is well known in the art, and for this reason, is not further described for simplicity. Hence, at the conclusion of block 165, a CR parameter 12c has been determined and is forwarded to the return loss evaluation system 13 (FIG. 1).

III. DISCONTINUITY (D) INSPECTION SYSTEM

The discontinuity inspection system 19 (FIG. 1) will now be described with reference to FIGS. 10–14. The discontinuity inspection system 19 is described in further detail in co-pending application entitled, "Surface Analysis System and Method," filed Dec. 22, 1995, and assigned Ser. No. 08/577,947, the disclosure of which is incorporated herein by reference as if set forth in full hereinbelow.

The discontinuity inspection system 19 classifies and quantifies surface discontinuities into three categories, unlike no other embodiment that is known in the art or industry. These three categories are binary thresholds, local gradients, and directional gradients, which are denoted by respective reference numerals 216, 217, 218 in FIG. 11 and which are described in detail hereafter.

A binary threshold 16 is a type of discontinuity resulting from severe cracks, chipping, or damage on the surface of the termination endface 37'. A binary threshold is defined as a plurality of pixel locations having intensities that differ by at least a predefined amount from an average of pixel intensities across generally the entire image of the fiber endface 37'. A binary threshold 16 can be linear or nonlinear, and can include an area of pixels.

A local gradient 217 is a type of discontinuity that results from surface texture and pitting. The dimension of a local gradient is one pixel. A local gradient is defined as a pixel location in an image having an intensity that differs by at least a predefined amount from intensities associated with all surrounding pixel locations.

A directional gradient 218 is a type of discontinuity resulting from scratches, lines, and minor cracks. Directional gradients are generated by gradients that are more than one pixel in dimension and generally follow a directional pattern. A direction gradient 218 is defined as a plurality of pixel locations having intensities that differ by at least a predefined amount from intensities associated with pixel locations situated about the directional gradient 218. A directional gradient 18 can be linear or nonlinear, and can include an area of pixels.

A primary difference between a directional gradient 218 and a binary threshold 216 is that a binary threshold 216 is determined by an analysis of a broad spectrum of pixels, i.e., generally the entire fiber image, whereas a directional gradient 218 is determined by an analysis of a local spectrum of pixels. Furthermore, the difference between the average intensity and either the upper or lower threshold (line of demarkation between binary threshold and not binary threshold) for determining binary thresholds 216 is larger than the difference between intensities that is utilized to identify directional gradients 218.

The aforementioned types of discontinuities can be used to fully describe the nature of discontinuities at the termination endface 37' and can be used, when combined with a weighing function, to determine the adequacy of the termination endface 37' for use in a connector.

Figure 11:
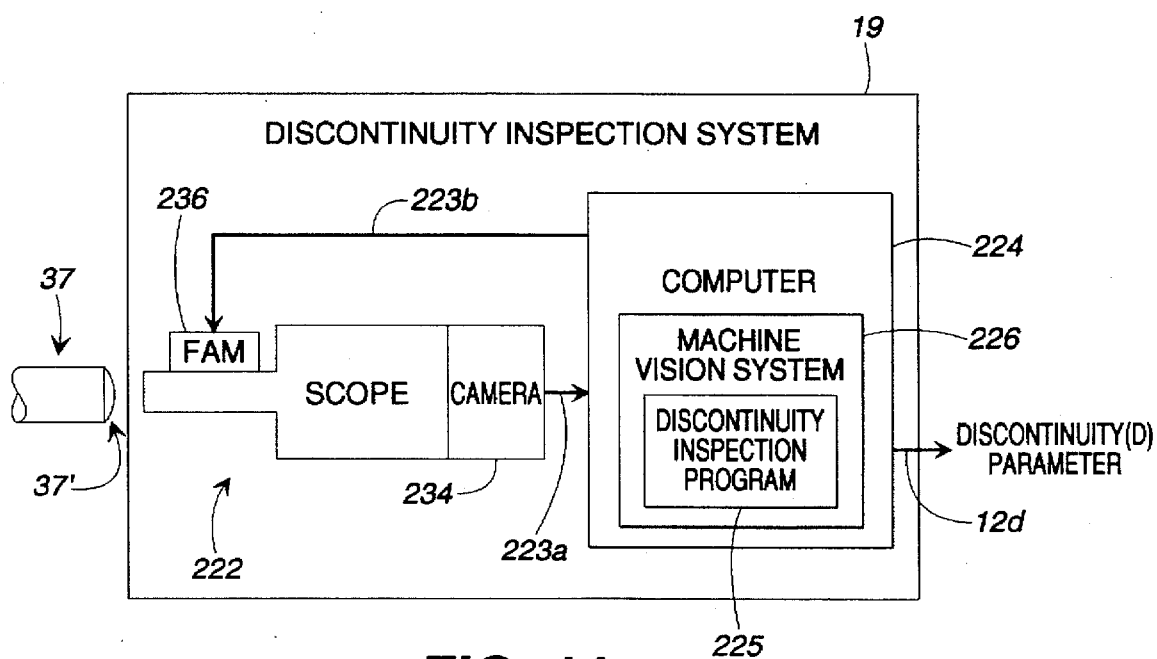
FIG. 11 is a block diagram showing a possible implementation of the discontinuity inspection system of FIG. 1 for determining a discontinuity parameter corresponding with the discontinuities of FIG. 10.

The surface analysis system 19 is illustrated by way of a block diagram in FIG. 11. The discontinuity inspection system 19 can determine automatically and contactlessly whether the optical fiber endface 37' has a continuous surface and is adequate or not for a connector based upon an image of the endface 37'. The discontinuity inspection system 19 provides a single objective definitive discontinuity parameter 12d regarding the fiber endface 37'. In architecture, the discontinuity inspection system 19 includes an imager 222 for capturing an image of the optical fiber endface 37', a computer 224 interfaced to the imager 222 for focusing the imager 222 and for receiving the image therefrom, and a machine vision system 226 interfaced to the computer 224 for processing the image under the control of the computer 224 and, particularly, the surface analysis program 225 so that the discontinuity parameter 12d is derived.

In the preferred embodiment, the imager 222 includes a scope 232, preferably a microscope with suitable magnification, for capturing an image of the termination endface 37', a camera 234 adapted to receive the image from the scope 232 and encode the image into electrical signal form, and a FAM 236 adapted to adjust the focus of the scope 232. The camera 234 can be any suitable imaging device for converting an optical image into an electrical signal, but is preferably a CCD. The CCD camera 234 comprises a pixel array for receiving light. Moreover, the pixel array encodes the image by generating analog voltage signals proportional to the intensity of light at each pixel of the CCD, as is well known in the art.

The FAM 236 in the preferred embodiment can move the scope 232 or a part thereof along the longitudinal axis of the fiber termination 37 so that the lens configuration within the scope 232 is moved to or from the termination endface 37'. A suitable FAM 236 is a piezoelectric transducer that can selectively move the scope 232 a distance based upon a closed loop control signal of voltage. The computer 224 provides a focus adjustment control 223b to the FAM 236, which signal may be amplified and/or buffered in order to generate the voltage signal that is used to move the scope 232.

A suitable FAM 236 is a model P721.00 piezoelectric transducer, which is manufactured by Physik Instrumente, Germany. The foregoing piezoelectric transducer can selectively move the scope 232 a distance of about 100 microns (with a resolution of about 3 nanometers) based upon a closed loop control signal of voltage between 0 and 100 volts. When 0 volts is supplied to the piezoelectric transducer 236, the focal point of the scope 232 is maintained at its greatest distance (it is completely retracted) from its target, whereas when 100 volts is supplied to the piezoelectric transducer 36, the focal point of the scope 232 is the closest distance (full extension) to the target.

When the model P721.00 piezoelectric transducer is utilized, the FAM 236 is provided with an amplifier (not shown for simplicity) for amplifying the focus adjustment control signal 223b so that the output to the piezoelectric element is within the voltage range of 0–100 volts. A suitable amplifier is a model E860.10 amplifier manufactured by and commercially available from Physik Instrumente, Germany.

The computer 224 can be any suitable computer system, many of which are known conventionally. A suitable computer is a model Gateway 2000 computer, which is commercially available from Gateway, USA.

The machine vision system 226 can be any suitable logic, processor, or computer that is conventional or custom made and that is configured to process the electrical signals from the imager 222. Many suitable machine vision systems are commercially available and their architectures and functionality are well known in the art. In the preferred embodiment, the machine vision system 226 is a model ITI ITEX OFG (overlay frame grabber) image processing card that is commercially available from Microdisc, Inc., U.S.A. This circuit board is plugged into the mother board associated with the computer 224.

The methodology that is employed by the discontinuity inspection program 225 (FIG. 3) will now be described. The discontinuity inspection program 225 detects and classifies discontinuities in the optical fiber endface 37' via two separate scans in any order through the image: once to identify any binary thresholds and another to identify any local and directional gradients.

Initially, a mask 262 having a circular aperture 264 is superimposed over the image so that the fiber endface 26' and core endface 25' can be analyzed exclusively of its surroundings. The mask 262 establishes a circular image disk 265 that will be analyzed. The fiber-to-plug transition 266, where epoxy is generally situated, is located within the expanse of the mask 62 and outside of the image disk 265, as is illustrated in FIG. 12, so that the transition 266 is eliminated from the analysis.

Binary thresholds 216 can be determined using any suitable technique. Many known techniques could be adapted to identify binary thresholds, as were previously defined herein. In the preferred embodiment, the binary thresholds 216 are determined by first avenging pixel values in the image. During the scan, each pixel value is then compared to the average. If a pixel value is equivalent to the average within a predefined threshold, then the pixel is considered to be free of binary thresholds. Alternatively, if the pixel value is unequivalent to the average within a predefined threshold 216, then the pixel is considered to be part of a binary threshold 216.

Figure 12:
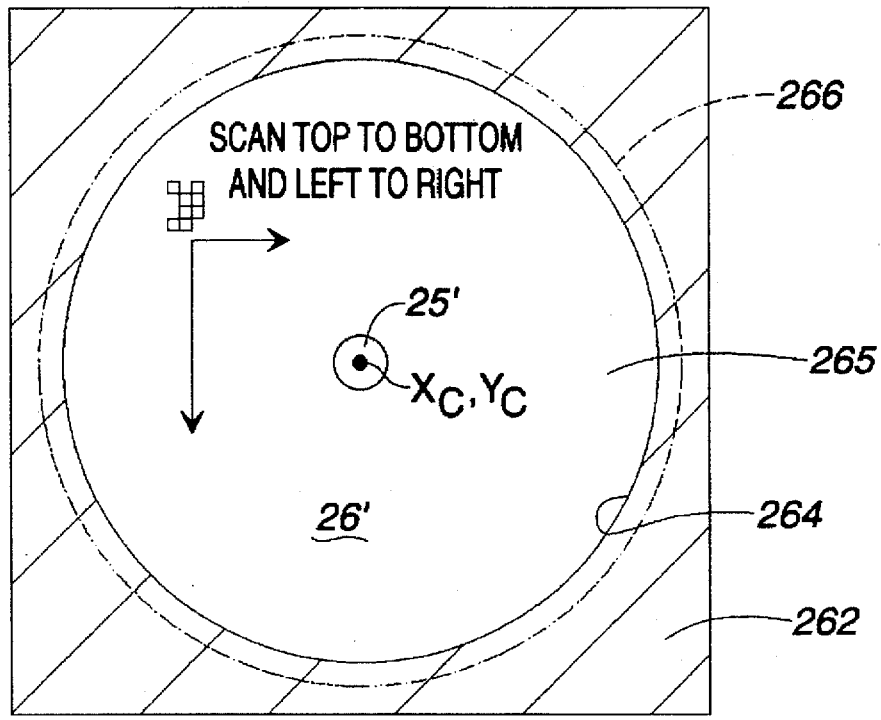
FIG. 12 is a schematic diagram showing a single pass scan methodology that is performed by the discontinuity inspection system of FIG. 11.
Figure 13:
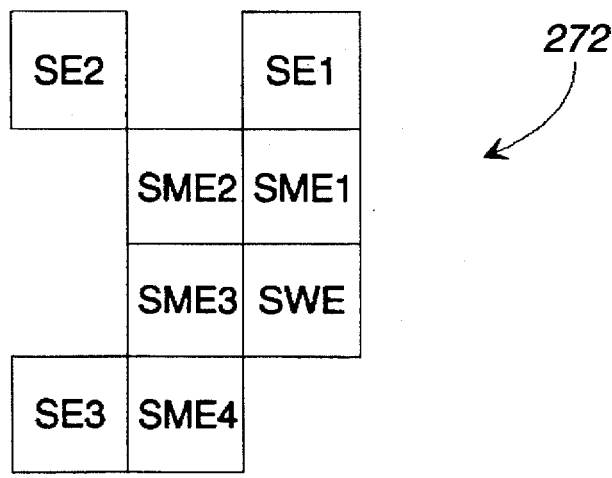
FIG. 13 is a schematic diagram showing a kernel of pixels that is analyzed for each pixel during the single pass scan of FIG. 12.

During the scan for locating local and directional gradients 217, 218, a pixel structure 272 of pixel values, as is illustrated in FIG. 13, is utilized for analyzing each pixel during the scan of the image disk 265 of FIG. 12. As is illustrated in FIG. 13, the pixel structure 272 includes: (a) a structure working element SWE, which represents the pixel that is currently being analyzed; (b) four structure memory elements SME1–SME4, which are utilized to determine whether the SWE is a local gradient or part of a directional gradient; and (c) three satellite elements SE1–SE3, which are utilized to determine whether or not the SWE is tentatively a gradient pixel (a local gradient or part of a directional gradient). Use of the pixel structure 272 and its pixel components SWE, SME1–SME4, and SE1–SE3 will be further clarified hereafter.

As further illustrated in FIG. 12, the pixel structure 272 is moved through the image disk 265 in a raster manner, for example but not limited to, scanning pixels along vertical lines from top to bottom and then moving between vertical lines from left to right, so that all the necessary information regarding local and directional gradients is retrieved by a single pass of the pixel structure 272 through the image disk 265. The two outermost pixels around the periphery of the image disk 265, or the two nearest pixels from the mask 262 within the aperture 264, are not analyzed in the scan, but are part of the analysis. In other words, the two nearest pixels from the mask 262 are never defined as the SWE, but are used as SE1–SE3, SME1–SME4, when the SWE is 3 and 4 pixels from the mask 262.

At each location of the pixel structure 272 in the image, the analysis of the SWE, SME1–SME4, and SE1–SE3 is as follows. First, an avenge of the satellite elements SE1–SE3 is computed and compared to the structure working element SWE. If the SE avenge is within a predefined range of the SWE, then it is concluded that no local gradient or directional gradient is present. Mathematically, the foregoing process can be expressed as follows:

$$\frac{SE1+SE2+SE3}{3} - T_{SE,L} \leq SWE \leq \frac{SE1+SE2+SE3}{3} + T_{SE,H} \quad (1)$$

where $T_{SE,L}$ is the low tolerance threshold, i.e., the amount in which the SE avenge must differ from the SWE at the lower end before it is concluded that a gradient exists and where $T_{SE,H}$ is the high tolerance threshold, i.e., the amount in which the SE avenge must differ from the SWE at the high end in order for a gradient to be concluded. If it is determined that the SWE is sufficiently different than the SE avenge based upon the thresholds $T_{SE,L}$, $T_{SE,H}$, then the SWE is tentatively considered a gradient.

In the case when the SWE is tentatively considered a gradient, the SWE is then compared to the structure memory elements SME1–SME4 in order to determine whether the SWE will (a) be classified as a local gradient, (b) be classified as part of a directional gradient, or (c) be reclassified as a nongradient. If the comparison between the SWE and each SME yields a conclusion that the SWE is different from all SMEs as defined by a predetermined threshold, then the SWE is considered a local gradient. If the comparison yields a conclusion that the SWE is equivalent to any SME as defined by a predetermined threshold and the SME is a gradient, then the SWE is considered to be part of the directional gradient corresponding with the one or more SMEs that yielded the result. Also, the one or more SMEs that yielded the result are reclassified as directional gradients, if currently classified as a local gradient. Furthermore, if the comparison yields a conclusion that the SWE is equivalent to any SME as defined by a threshold and the SME is a nongradient, then the SWE is deemed to be a nongradient.

The aforementioned threshold concepts can be expressed mathematically as follows:

$$SME1 - T_{SME,L} \leq SWE \leq SME1 + T_{SME,H} \quad (2)$$

$$SME2 - T_{SME,L} \leq SWE \leq SME2 + T_{SME,H} \quad (3)$$

$$SME3 - T_{SME,L} \leq SWE \leq SME3 + T_{SME,H} \quad (4)$$

$$SME4 - T_{SME,L} \leq SWE \leq SME4 + T_{SME,H} \quad (5)$$

where $T_{SME,L}$ is the low tolerance threshold and $T_{SME,H}$ is the high tolerance threshold for the SME analysis relative to SWE.

The discontinuity inspection program 25 in the preferred embodiment and best mode of the invention will now be described in detail hereafter with reference to FIG. 14. In the flow chart of FIG. 14, flow chart blocks represent blocks or subroutines of executable code for driving the computer 224 and the machine vision system 226.

Generally, the discontinuity inspection program 225 identifies binary thresholds 216, local gradients 217, and directional gradients 218. The binary thresholds 216 are identified during one scan, and the local and directional gradients 217, 218 are identified during another scan, or during a single pass of the pixel structure 272 through the image.

Figure 14:
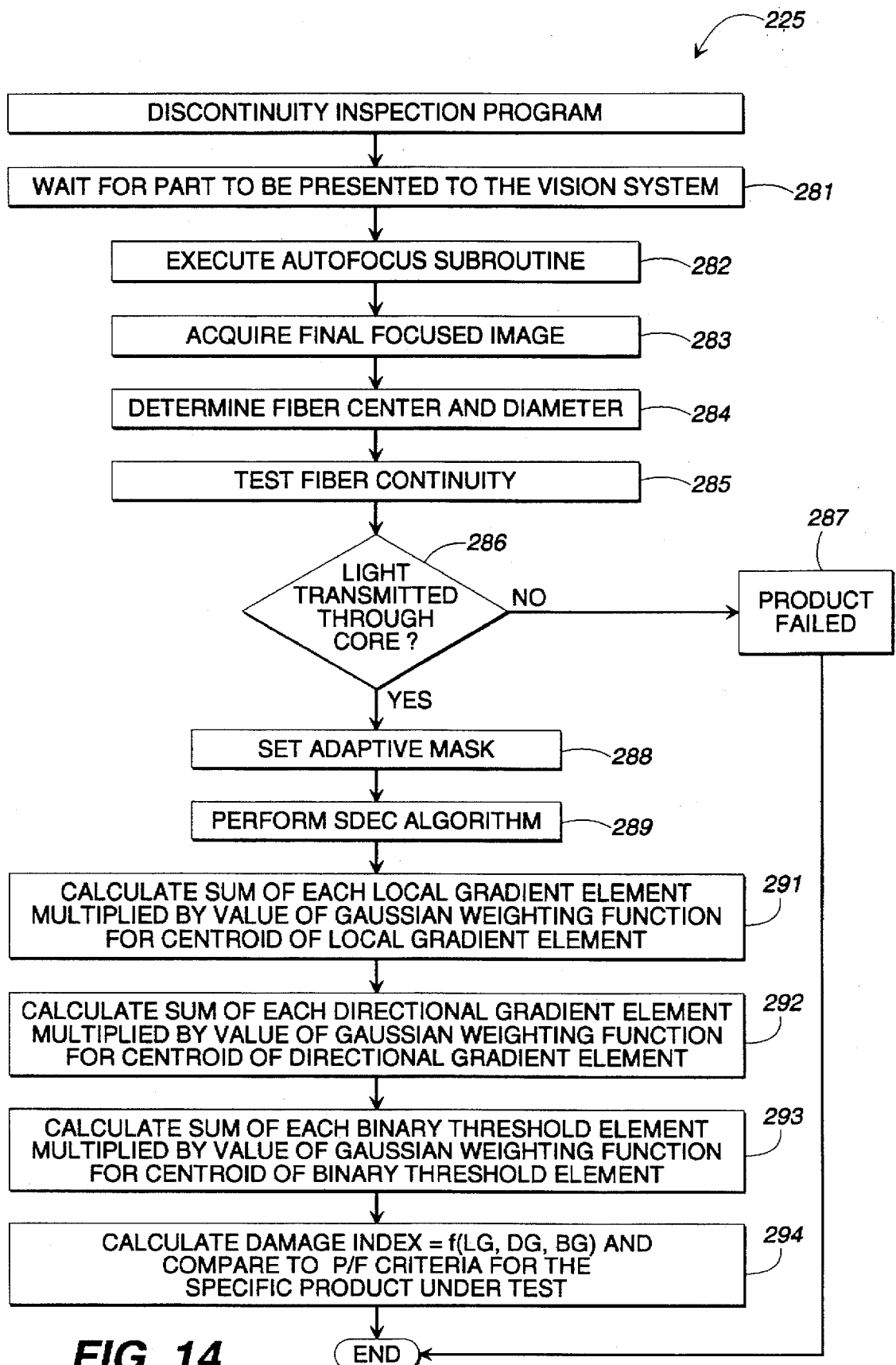
FIG. 14 is a flow chart showing a possible implementation of a discontinuity analysis program that is run by the machine vision system of FIG. 11.

Initially, the discontinuity inspection program 225 waits for the termination endface 37' to be presented to the imager 222, as indicated at block 281 in FIG. 14. An input may be provided to the computer 224 in order to initiate the program 225 past block 281. Alternatively, an automatic sensing system could be employed to produce such an input. The latter is desirable in a fully automated assembly line. Once an input is received, block 281 transfers to block 282.

Next, at block 282, an autofocus subroutine is employed so as to bring the endface 37' into proper focus. Any suitable autofocus method may be employed. After focusing, block 282 transfers to block 283.

At block 283 in FIG. 14, the optimally focused image is acquired by the discontinuity inspection program 225 for analysis. Block 283 transfers to block 284.

At block 284, the fiber center $C_1(x_c,y_c)$ and the fiber diameter are determined based upon the optimally focused image. Any suitable technique can be employed for accomplishing this task. At the conclusion of the code in block 284, block 284 transfers to block 285.

At blocks 285 and 286, the fiber termination 37 is tested in a rudimentary manner for continuity by passing light therethrough and examining the pixel intensities in the fiber image resulting from the passage of light. In the preferred embodiment, light is propagated into another end of the fiber that leads to the termination 237, by the block 286. Furthermore, if sufficient light, as determined by a predefined threshold and gradient analysis, passes through the endface 37' and into the scope 232, then the fiber termination 37 has passed this initial stage of examination. In this event, block 286 transfers to block 288. If, however, insufficient light passes through the endface 37', then block 286 transfers to block 287, which drives a product failure message to the user via an output device and the program 225 concludes.

When the fiber termination 37 passes this initial continuity test and block 288 is executed, an adaptive mask 262 (FIG. 12) is employed to mask out analysis of any pixels outside the area of the endface 37' in the image. The mask 262 is placed over the image so that the mask covers the fiber/plug boundary 266 (FIG. 12). Essentially, equation (4) hereinafter is implemented. Block 288 transfers to block 289.

At block 289, the image is scanned in order to generate the binary thresholds 216 ($gb_{i,j}$), local gradients 217 ($gl_{i,j}$), and directional gradients 218 ($gd_{i,j}$) at the locations ($x_i, y_j$) of the image, where $i=1\ldots n_x$ runs in the horizontal directional and $j=1\ldots n_y$ runs in the vertical direction, and where $n_x$ and $n_y$ are the maximum number of pixels in the horizontal and vertical directions, respectively.

Block 289 transfers to block 291. At code blocks 291 through 293, the indices $K_L$, $K_D$, and $K_B$ are calculated based on the values of $gl_{i,j}$, $gd_{i,j}$ and $gb_{i,j}$ as follows:

$$K_L = \sum_{i=1}^{n_x} \sum_{j=1}^{n_y} gl_{i,j} m_{i,j} e^{\frac{-[(x_i-x_c)^2+(y_i-y_c)^2]}{\beta}} \quad (6)$$

$$K_D = \sum_{i=1}^{n_x} \sum_{j=1}^{n_y} gd_{i,j} m_{i,j} e^{\frac{-[(x_i-x_c)^2+(y_i-y_c)^2]}{\beta}} \quad (7)$$

$$K_B = \sum_{i=1}^{n_x} \sum_{j=1}^{n_y} gb_{i,j} m_{i,j} e^{\frac{-[(x_i-x_c)^2+(y_i-y_c)^2]}{\beta}} \quad (8)$$

$\beta$ =constant sensitivity factor
$gl_{ij}$ =value of local gradient at location ($x_i, y_i$)
$gd_{ij}$ =value of bidirectional gradient at location ($x_i, y_i$)
$gb_{ij}$ =value of binary threshold at location ($x_i, y_i$)
$x_c,y_c$ =location of fiber center
$x_i,y_i$ =location of a pixel in image
and $m_{ij}$ is a fiber disk mask given by:

$$m_{ij}=0, \text{ for } (x_i-x_c)+(y_j-y_c)>R_f1, \text{ for } (x_i-x_c)+(y_j-y_c)\leq R_f \quad (9)$$

The constant sensitivity factor $\beta$ is 10,000 in the preferred embodiment, but many other values are obviously possible, and affects the shape of and weighing applied by the gaussian function. When the sensitivity factor $\beta$ is high, the value of the e-exponent is small and the gaussian function exhibits a relatively flatter shape. Conversely, when the sensitivity factor $\beta$ is low, the value of the e-exponent is large and the gaussian function exhibits a much more peak-like shape.

Implementation of the aforementioned equations is accomplished as follows. At block 291, a local gradient table, or array, is assembled. In this regard, each local gradient value $gl_{i,j}$ is weighted by a corresponding weight k, where the weight $k=e^{-[(xi-xc)2+(yi-yc)2]/b}$, which depends upon the local gradient's proximity to the fiber center $x_c,y_c$. The resultant weighted local gradient values are placed in the local gradient table. Next, the local gradient index $K_L$ is computed by adding together the weighted local gradient values from the local gradient table. Block 291 transfers to block 292.

At block 292, a directional gradient table, or array, is assembled. In this regard, each directional gradient value $gd_{i,j}$ is weighted by a corresponding weight k, where the weight $k=e^{-[(xi-xc)2+(yi-yc)2]/b}$, which depends upon the directional gradient's proximity to the fiber center $x_c,y_c$. The resultant weighted directional gradient value is placed in the directional gradient table. Next, the directional gradient index $K_D$ is computed by adding together the weighted directional gradient values from the directional gradient table. Block 292 transfers to block 293.

At block 293, a binary threshold table, or army, is assembled. In this regard, each binary threshold value $gb_{i,j}$ is weighted by a corresponding weight k, where the weight $k=e^{-[(xi-xc)2+(yi-yc)2]/b}$, which depends upon the binary threshold's proximity to the fiber center $x_c,y_c$. The resultant weighted binary threshold value is placed in the binary threshold table. Next, the binary threshold index $K_B$ is computed by adding together the weighted binary threshold values from the binary threshold table. Block 293 transfers to block 294.

At block 294, the final value of the discontinuity parameter D is obtained by a weighted sum of the individual indices as follows:

$$\Psi=K_L+W(K_D+K_B) \quad (10)$$

The discontinuity parameter 12d is output by the program 25. Hence, automatically and contactlessly, the endface 37' has been analyzed and a definitive conclusion has been reached regarding discontinuities in the endface 37'.

Note that it has been empirically determined by the inventors that the indices $K_L$ and $K_D$ are highly correlated, based upon their definitions and, therefore, there is a need for only a single weight W in the equation (5) above. The weight W is calculated from a formula which is based on a first order approximation of the relationship between return loss, the directional gradient index $K_D$, and the local gradient index $K_L$, as described hereafter.

First, a sample of connectors with similar geometric characteristics is chosen. These characteristics include, for example but not limited to, fiber type (e.g., domed or flat); the degree of eccentricity (deviation of fiber core relative to the center of the ferrule, or plug; the degree of undercut or protrusion of the fiber core relative to the surrounding fiber surface, and the existence or nonexistence of microbends.

Next, the indices $K_L$ and $K_D$ ale calculated for each of the sample connectors. The return loss for the sample connectors is computed. The indices $K_L$ and $K_D$ are plotted versus the return loss. Lines are fitted to $K_L$ and $K_D$ and their slopes are calculated as $m_1$ and $m_2$, respectively. Finally, the weight W is computed as the ratio of $m_1$ to $m_2$, or $W=m_1/m_2$.

IV. RETURN LOSS EVALUATION SYSTEM

Figure 15:
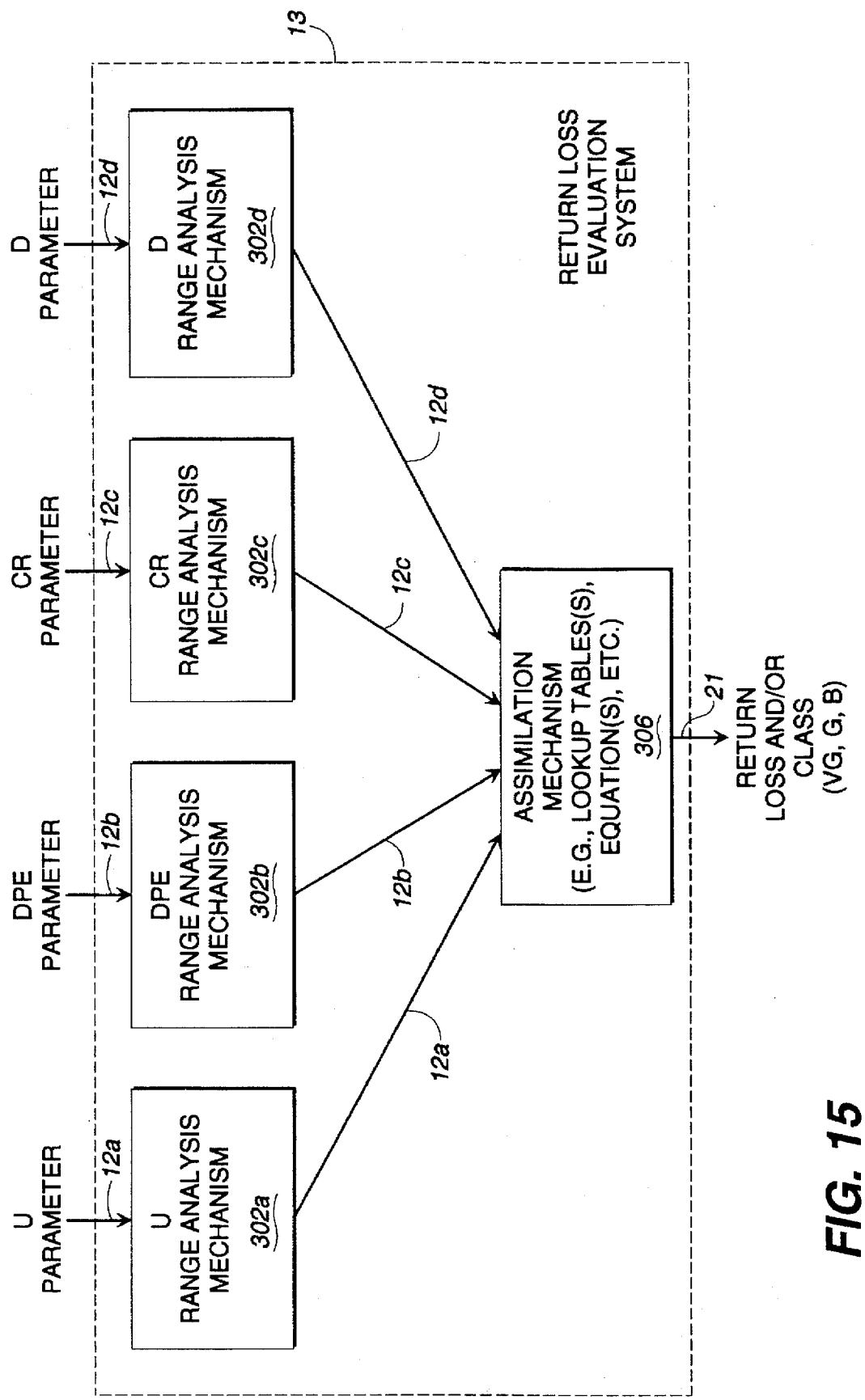
FIG. 15 is a block diagram showing the return loss evaluation system within the return loss determination system of FIG. 1.

The return loss evaluation system 13 (FIG. 1) is further described hereafter with reference to the block diagram in FIG. 15. The return loss evaluation system 13 includes a U/P range analysis mechanism 302a, a DPE range analysis mechanism 302b, a CR range analysis mechanism 302c, a discontinuity (D) range analysis mechanism 302d, and an assimilation mechanism 306. Preferably, the aforementioned components are implemented in software in a suitable computer. However, hardware embodiments and embodiments derived from combinations of software and hardware are possible. These components are described in further detail hereafter.

The U/P range analysis mechanism 302a is configured to receive the U/P parameter 12a and determine whether the U/P parameter 12a falls within a predefined U/P range. The U/P range analysis mechanism 302a essentially acts as an initial test mechanism to ensure that the U/P parameter 12a is not at an extreme value. The U/P range analysis mechanism indicates an unacceptable return loss when the U/P parameter 12a falls outside the predefined U/P range. When it is outside of the range, the mechanism 302a advises the assimilation mechanism 306 to output a return loss class of "bad." If the U/P parameter 12a falls within the predefined U/P range, then the U/P range analysis mechanism 302a forwards the U/P parameter 12a to the assimilation mechanism 306, as indicated by reference 304a. In the preferred embodiment, the acceptable range of the spherical undercut/protrusion is between +100 and –225 nanometers.

A DPE range analysis mechanism 302b is configured to receive the DPE parameter 12b and determine whether the DPE parameter 12b falls within a predefined DPE range. The DPE range analysis mechanism 302b essentially acts as an initial test mechanism to ensure that the DPE parameter 12b is not at an extreme value. The DPE range analysis mechanism indicates an unacceptable return loss when the DPE parameter 12b falls outside the predefined DPE range. When it is outside of the range, the mechanism 302b advises the assimilation mechanism 306 to output a return loss class of "bad." If the DPE parameter 12b falls within the predefined DPE range, then the DPE range analysis mechanism 302b forwards the DPE parameter 12b to the assimilation mechanism 306, as indicated by reference 304b. In the preferred embodiment, the acceptable range is essentially any value that is less than 50 micrometers.

A CR range analysis mechanism 302c is configured to receive the CR parameter 12c and determine whether the CR parameter 12c falls within a predefined CR range. The CR range analysis mechanism 302c essentially acts as an initial test mechanism to ensure that the CR parameter 12c is not at an extreme value. The CR range analysis mechanism indicates an unacceptable return loss when the CR parameter 12c falls outside the predefined CR range. When it is outside of the range, the mechanism 302c advises the assimilation mechanism 306 to output a return loss class of "bad." If the CR parameter 12c falls within the predefined CR range, then the CR range analysis mechanism 302c forwards the CR parameter 12c to the assimilation mechanism 306, as indicated by reference 304c. In the preferred embodiment, the acceptable range is between 5 and 30 millimeters.

A discontinuity range analysis mechanism 302d is configured to receive the D parameter 12d and determine whether the D parameter 12d falls within a predefined discontinuity range. The discontinuity range analysis mechanism 302d essentially acts as an initial test mechanism to ensure that the D parameter 12d is not at an extreme value. The discontinuity range analysis mechanism indicates an unacceptable return loss when the D parameter 12d falls outside the predefined discontinuity range. When it is outside of the range, the mechanism 302d advises the assimilation mechanism 306 to output a return loss class of "bad." If the D parameter 12d falls within the predefined discontinuity range, then the discontinuity range analysis mechanism 302d forwards the D parameter 12d to the assimilation mechanism 306, as indicated by reference 304d. In the preferred embodiment, the acceptable range is any D value that is less than 60 (unitless index).

The assimilation mechanism 306 receives the parameters 12a–12d, analyzes and assimilates them, and produces the return loss class 21. To analyze the parameters 12a–12d, the assimilation mechanism 306 may employ a look-up table(s), an equation(s), etc. In the preferred embodiment, an equation is utilized as described hereafter.

The formula for determining the return loss based on geometry parameters 12a–12d is determined as follows:

$$R_{loss} \text{ single-end prod to prod} = R_{loss\,max} \text{ for Zone } \gamma 1 \cdot D \text{ Grade of surface in terms of damage index} \cdot (1 - X \cdot |P_{optimum} \text{ planar for zone } \gamma 1 - P_{planar}| \text{ actual of sample}) \quad (11)$$

$$= R_{loss\,max} \text{ for Zone } \gamma 2 \cdot D \text{ Grade of surface in terms of damage index} \cdot (1 - X \cdot |P_{optimum} \text{ planar for zone } \gamma 2 - P_{planar}| \text{ actual of sample}) \quad (12)$$

$$= R_{loss\,max} \text{ for Zone } \gamma 3 \cdot D \text{ Grade of surface in terms of damage index} \cdot (1 - X \cdot |P_{optimum} \text{ planar for zone } \gamma 3 - P_{planar}| \text{ actual of sample}) \quad (13)$$

$$= R_{loss\,max} \text{ for Zone } \gamma 4 \cdot D \text{ Grade of surface in terms of damage index} \cdot (1 - X \cdot |P_{optimum} \text{ planar for zone } \gamma 4 - P_{planar}| \text{ actual of sample}) \quad (14)$$

$$\approx 20 \text{ dB for Zone } \gamma 5 \text{ (when there is an gap between connector fiber endface)} \quad (15)$$

The variables in the aforementioned equations are defined hereafter.

$R_{loss}$ is the return loss corresponding with a standard single-ended product-to-product approach.

$R_{loss\ max}$ for zones $\gamma 1$ through $\gamma 5$ is the maximum return loss empirically determined for a certain range of undercut/protrusion. Limitations of maximum come from pressure of loading, sub-surface damage due to polish materials and techniques, etc. In the preferred embodiment, the values for $R_{loss\ max}$ for zones $\gamma 1$ through $\gamma 5$ are as follows:

$R_{loss\ max}$ of $\gamma_1$=58 dB     (16)

$R_{loss\ max}$ of $\gamma_2$=58 dB     (17)

$R_{loss\ max}$ of $\gamma_3$=70 dB     (18)

$R_{loss\ max}$ of $\gamma_4$=35 dB     (19)

D is the discontinuity parameter 12d (grade of surface damage; a unitless value). Preferably, D is defined numerically as follows:

| | | |
|---|---|---|
| D = | 1.0 if damage index < 3.0 | (20) |
| | 0.9 if damage index $\in$ (3, 6) | (21) |
| | 0.8 if damage index $\in$ (6, 10) | (22) |
| | 0.7 if index > 10 | (23) |
| | 0.3 if broken fiber as it fails continuity tests of surface grading algorithm. | |

Note that "( )" denote ranges in the above equations.

X is a sensitivity factor corresponding with the zone under analysis (units are (1/μm). In the preferred embodiment, the values of X are as follows:

$x_{\gamma 1}$=1.3     (24)

$x_{\gamma 2}$=0.5     (25)

$x_{\gamma 3}$=2.5     (26)

$x_{\gamma 4}$=15     (27)

$P_{optimum}$ is the planar protrusion (undercut if negative, and always $P_{spherical}=-U_{spherical}$) that yields maximum return loss in a zone $\gamma$. Preferably, the value of $P_{optimum}$ for each zone $\gamma$ is as follows:

$P_{optimum\gamma 1}$=0.1μ (microns)     (28)

$P_{optimum\gamma 2}$=0.1μ     (29)

$P_{optimum\gamma 3}$=0.075μ     (30)

$P_{optimum\gamma 4}$=0.075μ     (31)

$P_{planar}$ (actual of sample) is the effective undercut (negative) or protrusion (positive) determined as follows:

$P_{planar}=a(CR)^2+b(CR)+c+P_{spherical}$     (32)

where a, b, c are polynomial coefficients to be determined from a sample empirical system as follows:

$270=a(71.233)+b(8.44)+c$ $150=a(404.814)+b(20.12)+c$ $80=a(961)+b(31)+c$ where samples with 8.44, 20.12 and 31 nm radius of CR with corresponding planar protrusions of 270, 150, and 80 nm have been used. From the above equations, a, b, and c are computed and thus have the following values:

a=17 b=−15.09 c=384.12

$P_{spherical}$ is the spherical undercut (negative) or protrusion (positive), i.e., the U/P parameter 12a (FIG. 1).

Note that the value of $(P_{planar}-P_{spherical})$ is extremely sensitive to radius of curvature. Consider the following examples.

For CR=20 nm:

$0.17(20)^2-15(20)+384.4=152.4$ $\Delta z$ $P_{planar}-P_{spherical}=152.4$ nanometers For CR=30 nm $0.17(30)^2-15(30)+38.4=87.4$ $\Delta=(P_{planar}-P_{spherical})=87.4$ nanometers To further emphasize the importance of the above conversion from $P_{spherical}$ to $P_{planar}$ as a function of radius note that at CR=19 nm, $P_{spherical}$=−50 nm, which converts to $P_{planar}$=+100 nm. This is a tremendous difference given that the entire range of interest is only a few hundred nanometers.

CR is the radius of curvature, i.e., the CR parameter 12c (FIG. 1). CR is in millimeters. In the preferred embodiment, CR$\xi$(5,30) nm.

In the preferred embodiment, the DPE parameter is a P/F criterion and should always be less than 50 μm for the system to continue processing.

The above equations have been verified for connectors measured for return loss at room temperature (@20° C.). It is understood that certain combinations of the parameters described before could result in connectors whose performance is sensitive to temperature variations. In order to ensure performance stability Bellcore, an organization that advises the telecommunications industry, recommends in their publication GR-320 that the spherical undercut/protrusion fall in the range of ±50 nm.

In the above discussion and the preferred embodiment, the zones $\gamma$ of interest are defined as follows:

Zone $\gamma 1=P_{planar}\in(75,200)$nm     (33)

Zone $\gamma 2=P_{planar}\in(0, 75)$nm     (34)

Zone $\gamma 3=P_{planar}\in(-75,0)$nm     (35)

Zone $\gamma 4=P_{planar}\in(-150,-75)$nm     (36)

Zone $\gamma 5=P_{planar}<(-150)$ nm     (37)

As an example, at a CR of 19 nm, these zones correspond to the following:

Zone $\gamma 1=P_{spherical}=(-75,50)$ nm     (38)

Zone $\gamma 2=P_{spherical}=(-150,-75)$ nm     (39)

Zone $\gamma 3=P_{spherical}=(-225,-150)$ nm     (40)

Zone $\gamma 4=P_{spherical}=(-300, -225)$ nm     (41)

Zone $\gamma 5=P_{spherical}<(-300)$ nm     (42)

Thus, after the assimilation mechanism 306 receives the parameters 12a–12d and assimilates them using the return loss equation, the mechanism 306 produces the return loss $R_{loss}$. Based upon the return loss $R_{loss}$, the assimilation mechanism 306 determines a class 21. In the preferred embodiment, if R$_{loss}$ is less than 40 db, then the termination endface 37' is classified as bad. If R$_{loss}$ is between 40 and 50 db, then the endface 37' should not be classified automatically and resort should be had to manual testing with a reference jumper. If R$_{loss}$ is between 50 and 60 db, then the endface 37' is classified as good. Finally, if the R$_{loss}$ is greater than 60, then the endface 37' should be classified as very good. The assimilation mechanism 306 can output the class and/or the R$_{loss}$ to a user or an automated system, such as a computer.

Figure 16:
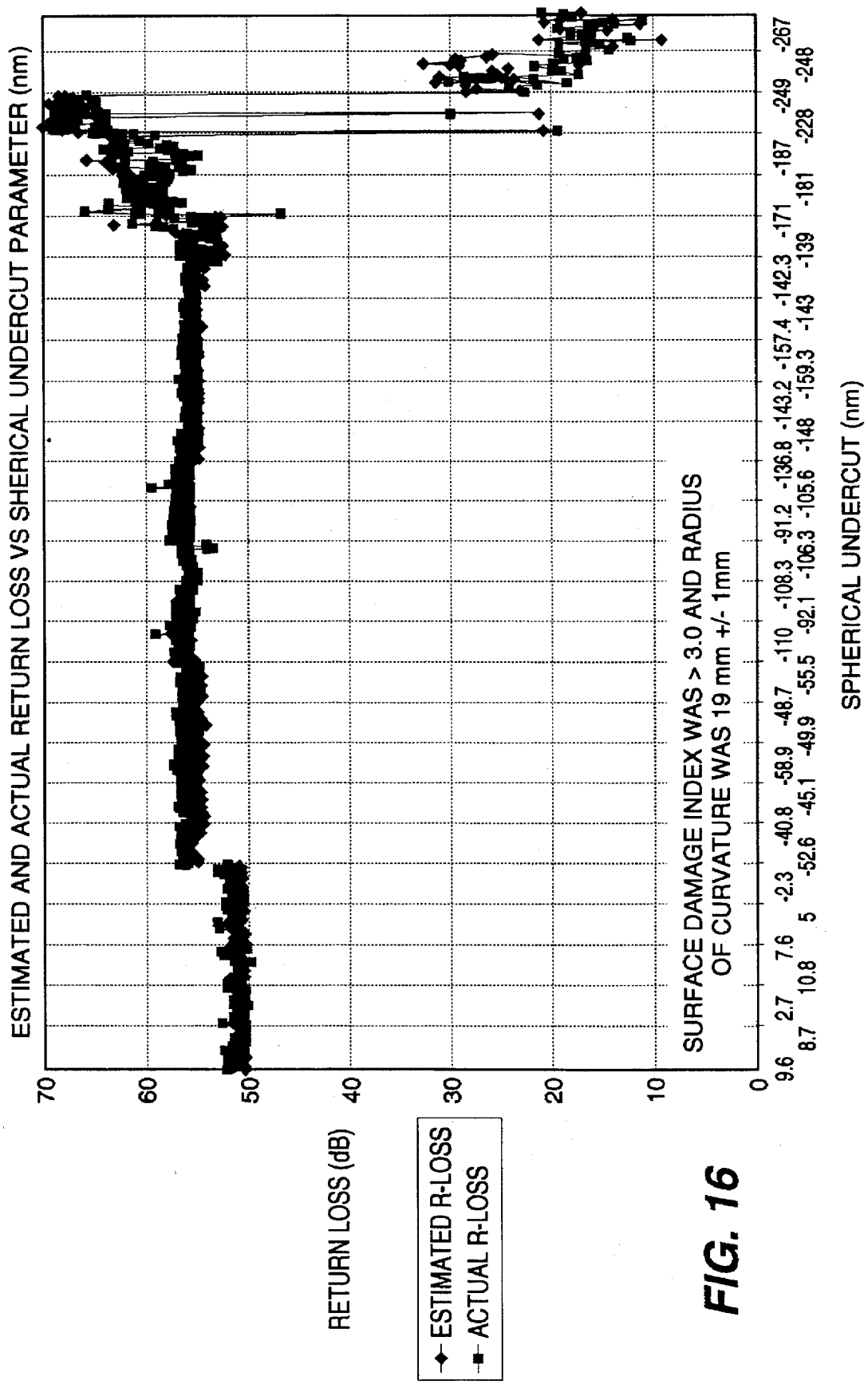
FIG. 16 is a graph of estimated and actual return loss versus the U/P parameter.
Figure 17:
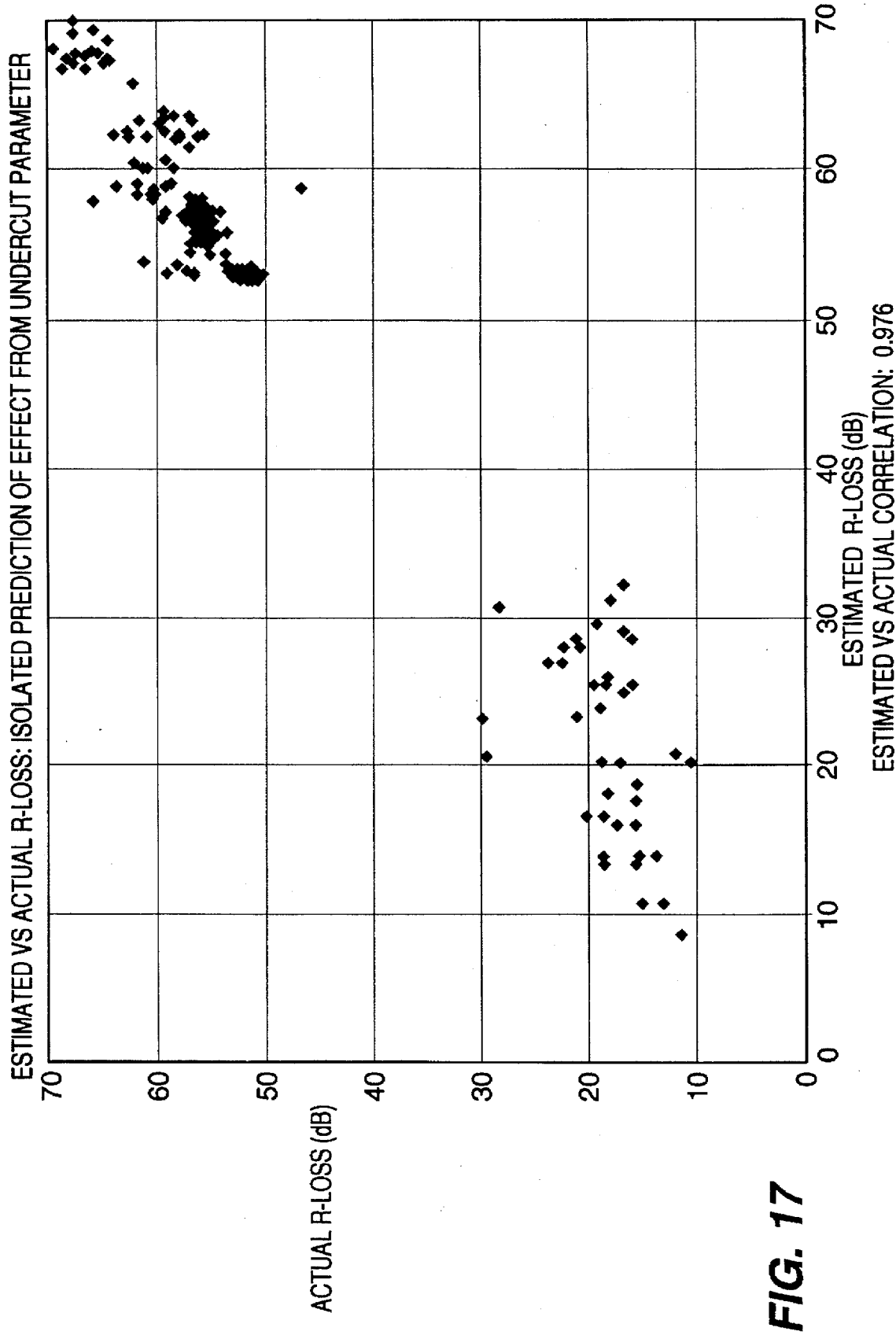
FIG. 17 is a graph of estimated versus actual return loss relative to an isolated prediction of the effect from the U/P parameter.

FIG. 16 is a graph of estimated and actual return loss versus the U/P parameter 12a. As is shown in FIG. 16, the estimated return loss closely corresponds to the actual return loss, based upon variances in the U/P parameter 12a. In fact, as shown in FIG. 17, which is a graph of estimated versus actual return loss relative to an isolated prediction of the effect from the U/P parameter 12a, them is a 0.974 correlation between the estimated and actual return loss relative to the effect of the U/P parameter 12a. In this discussion, these correlations occur in the case where the remaining parameters are optimized and kept constant. When the other parameters are not optimal, then the correlation coefficient is in general reduced.

Figure 18:
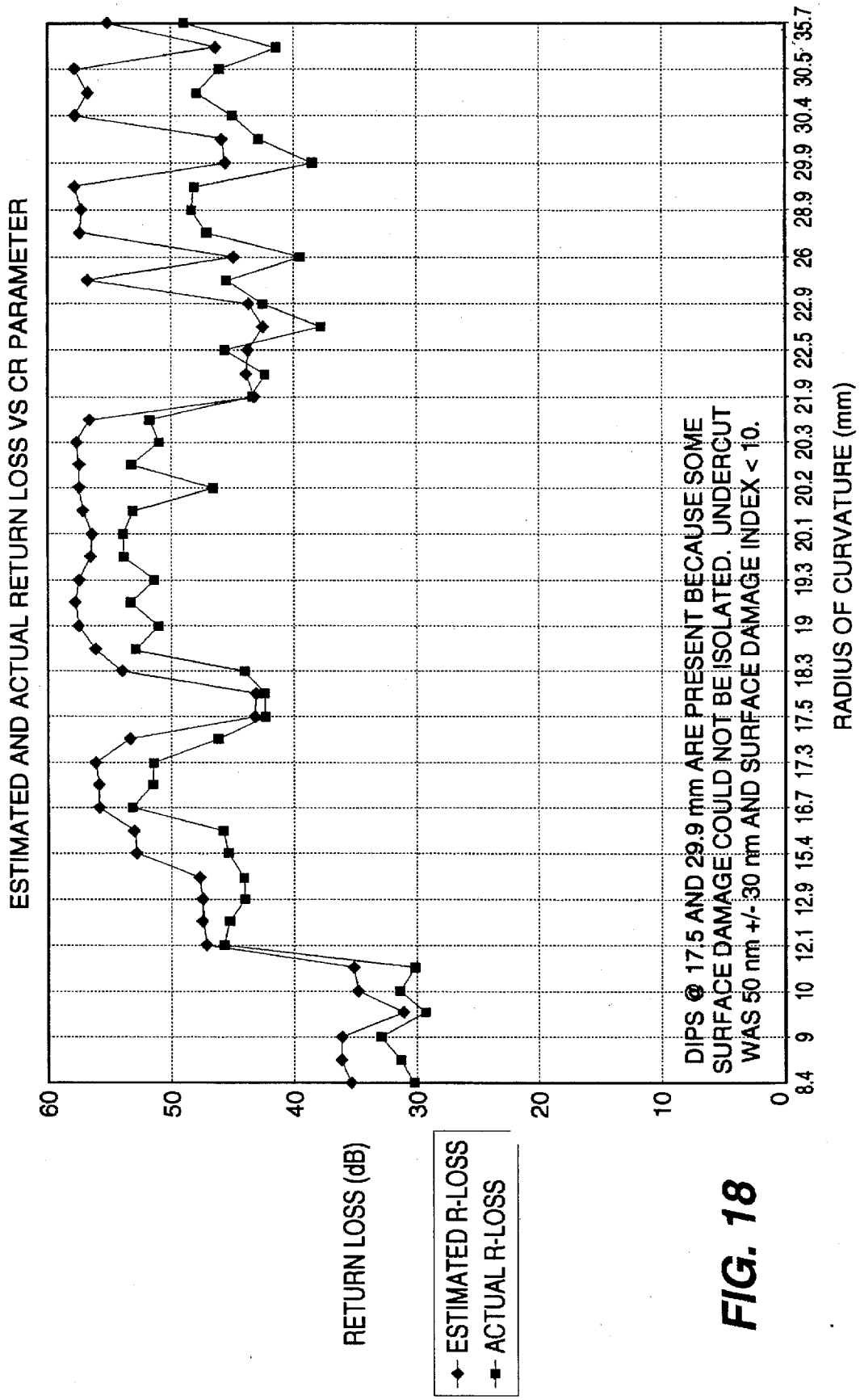
FIG. 18 is a graph of estimated and actual return loss versus CR parameter.
Figure 19:
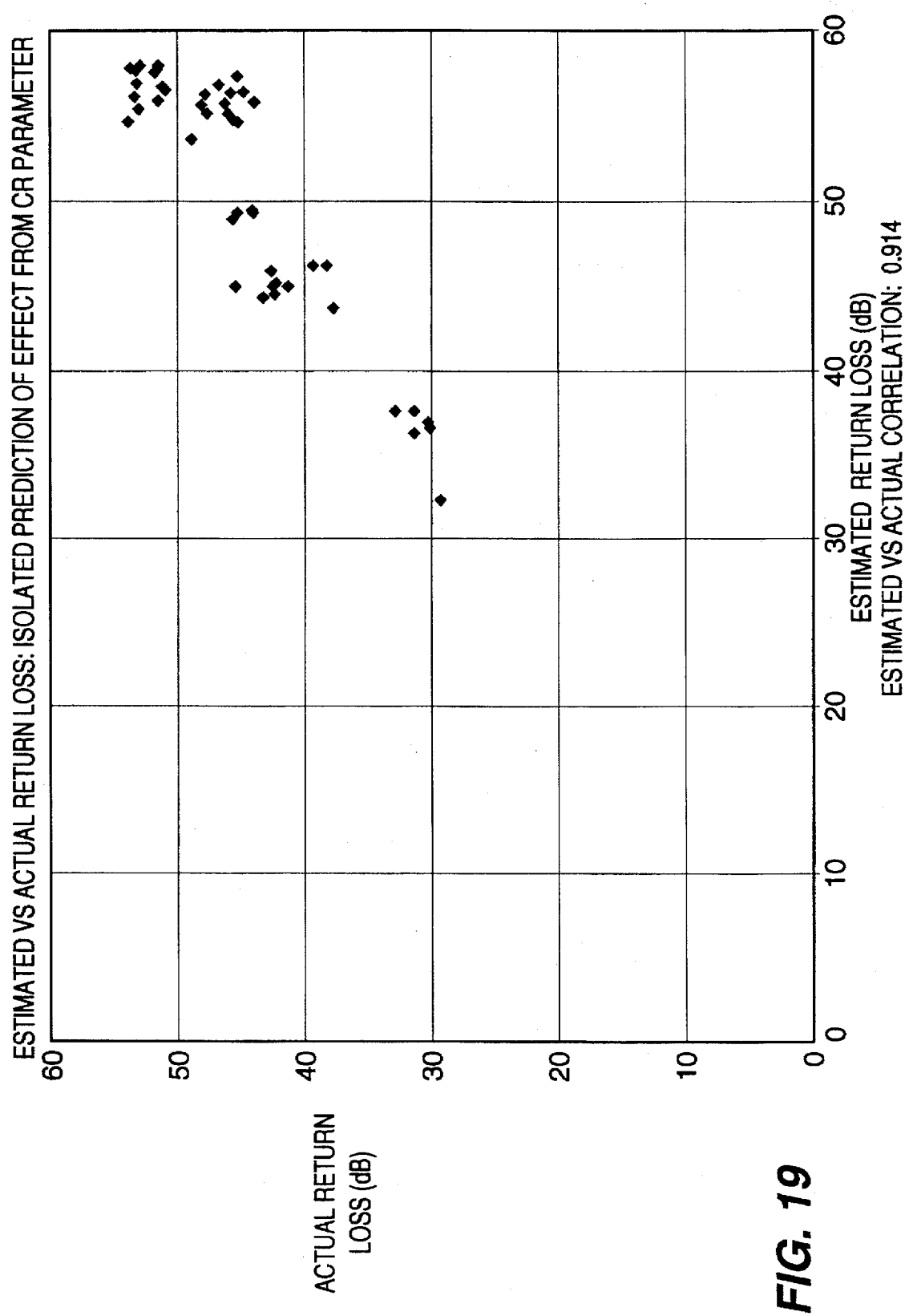
FIG. 19 is a graph of estimated versus actual return loss relative to an isolated prediction of the effect from the CR parameter.

FIG. 18 is a graph of estimated and actual return loss versus the CR parameter 12c. As is shown in FIG. 18, the estimated return loss closely corresponds to the actual return loss, based upon variances in the CR parameter 12c. In fact, as shown in FIG. 19, which is a graph of estimated versus actual return loss relative to an isolated prediction of the effect from the CR parameter 12c, there is a 0.914 correlation between the estimated and actual return loss relative to the effect of the CR parameter 12c.

Figure 20:
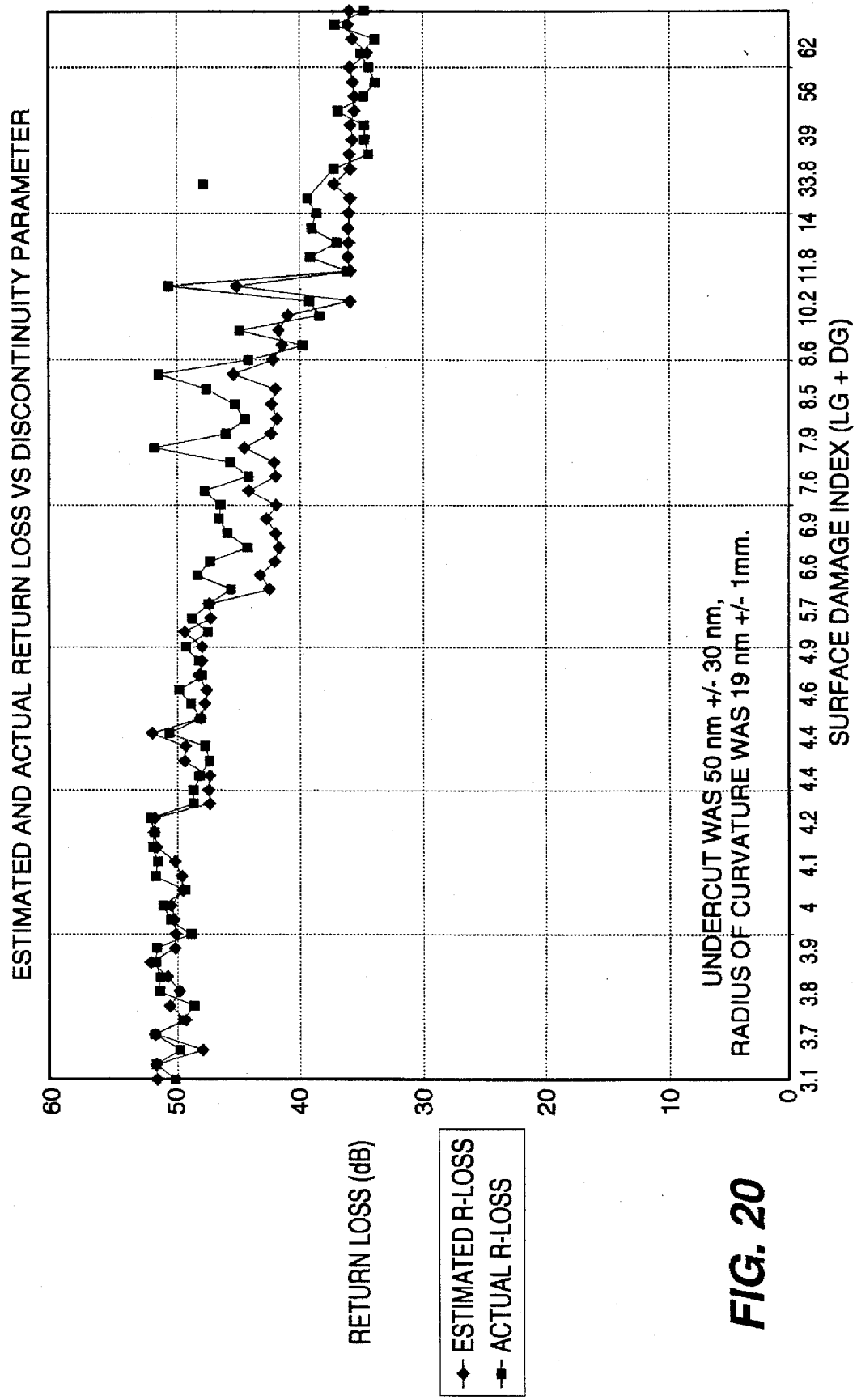
FIG. 20 is a graph of estimated and actual return loss versus the discontinuity parameter.
Figure 21:
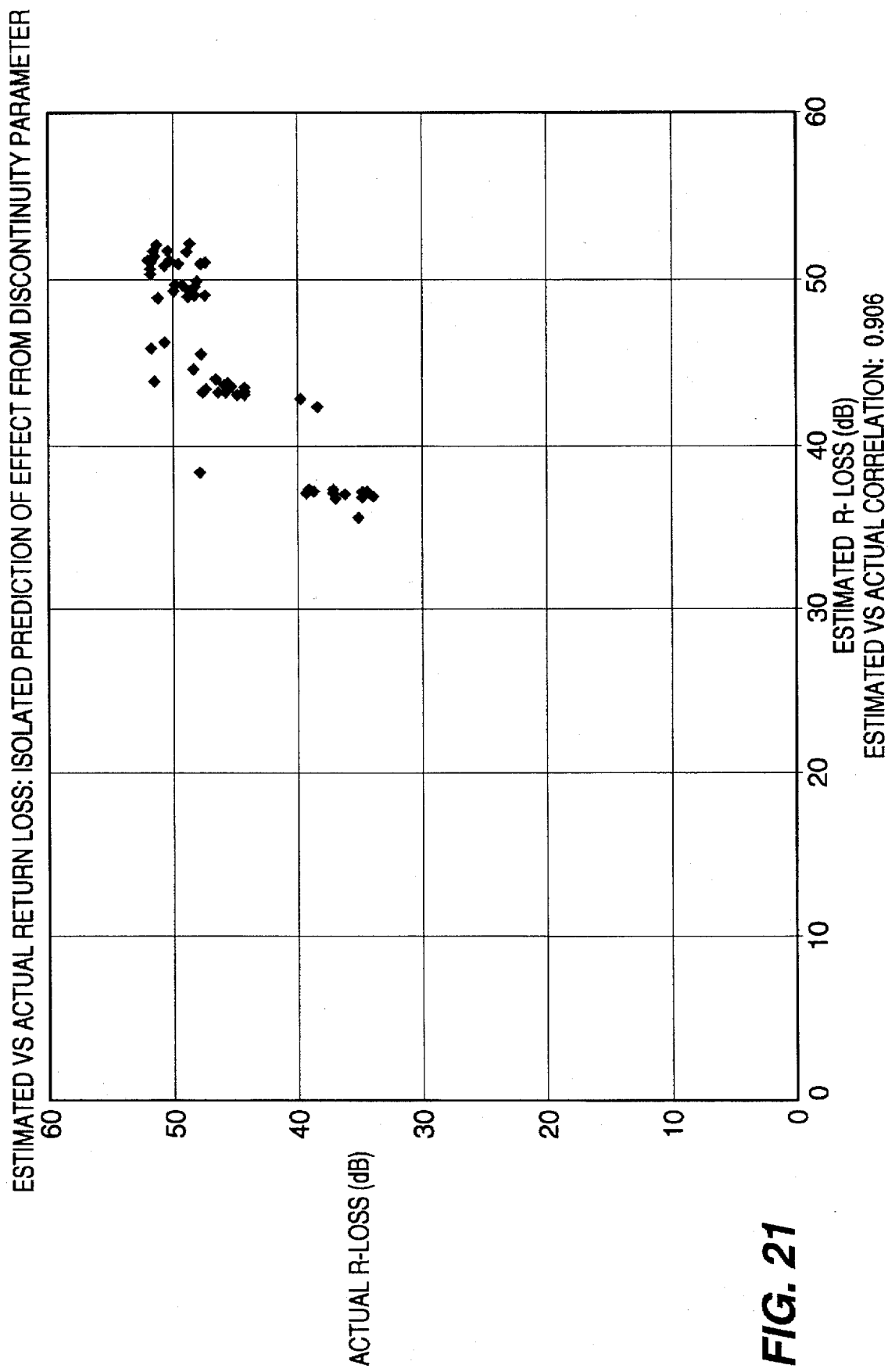
FIG. 21 is a graph of estimated versus actual return loss relative to an isolated prediction of the effect from the discontinuity parameter.

FIG. 20 is a graph of estimated and actual return loss versus the D parameter 12d. As is shown in FIG. 20, the estimated return loss closely corresponds to the actual return loss, based upon variances in the D parameter 12d. In fact, as shown in FIG. 21, which is a graph of estimated versus actual return loss relative to an isolated prediction of the effect from the D parameter 12d, there is a 0.913 correlation between the estimated and actual return loss relative to the effect of the D parameter 12d.

Figure 22:
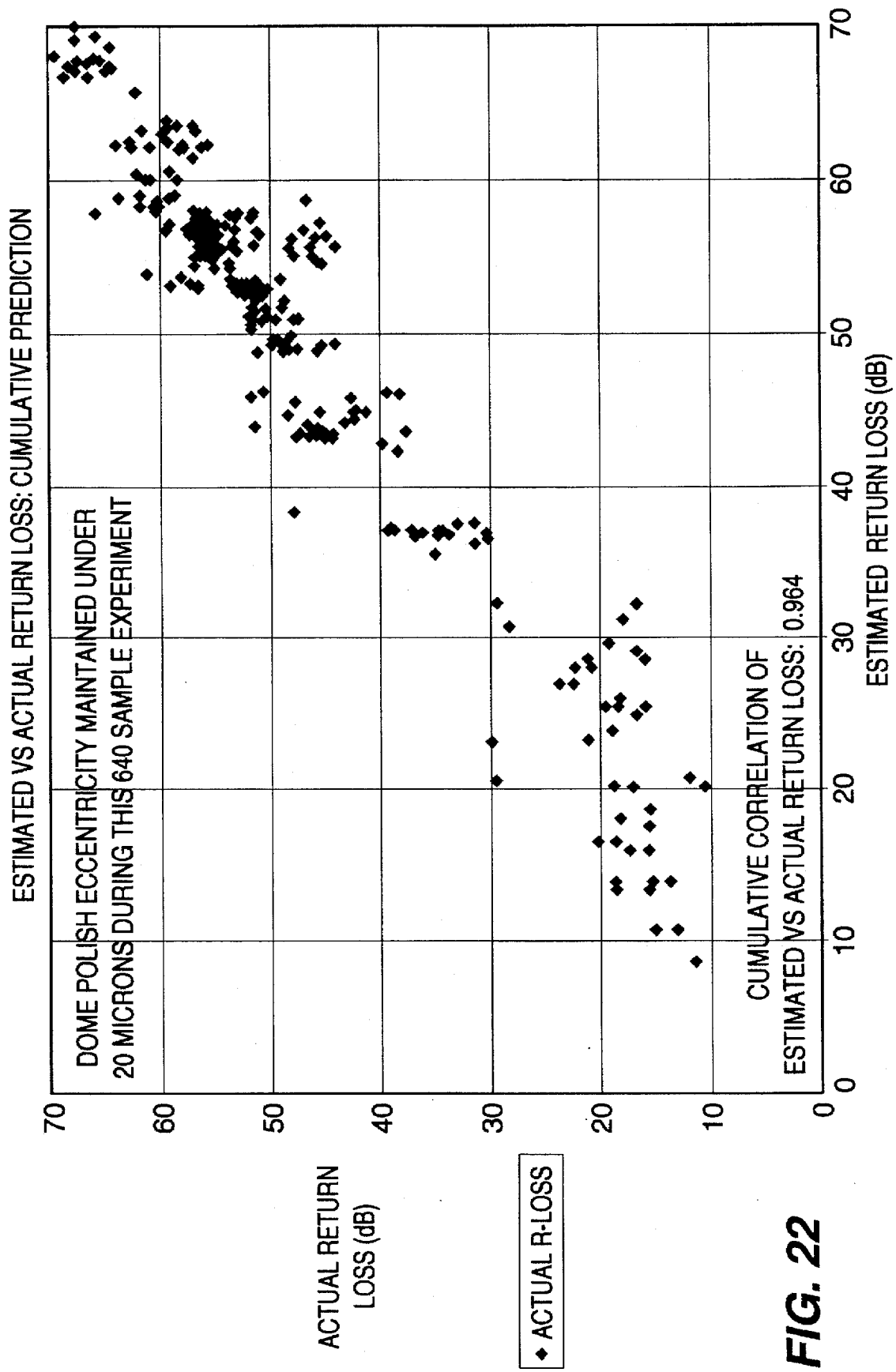
FIG. 22 is a graph of estimated versus actual return loss relative to a cumulative prediction of all aforementioned parameters.

FIG. 22 is a graph of estimated versus actual return loss relative to a cumulative prediction of all aforementioned parameters. As is shown in FIG. 22, the estimated return loss closely corresponds to the actual return loss, based upon variances in the combination of the parameters 12a–12d. In fact, the correlation is 0.964. Thus, correlation of these parameters does yield an accurate measurement of the actual return loss associated with a termination endface 37'.

Note that the programs 120, 151, 161, 225, 302a–302d, and 306 that were described in this detailed description section can be stored on any computer readable medium for use by or in connection with a computer related system or method. In the context of this document, a computer readable medium is an electronic, magnetic, optical, or other physical device or means that can contain or store a computer program for use by or in connection with a computer related system or method. Thus, for example, any of these programs can be stored and transported on a portable diskette, or as another example, the segment detection program could be stored in the memory of a computer for the purpose of driving the computer when called upon.

It will be obvious to those skilled in the art that many modifications and variations may be made to the embodiments as described without substantially departing from the spirit and scope of the present invention. It is intended that all such modifications and variations be included herein within the scope of the present invention, as is set forth in the appended claims.

As an example of a variation, the parameters can be measured with subsystems that differ from those utilized by the preferred embodiment. For instance, the DPE, CR, and U/P parameters can be determined by interpreting images generated with a system that constructs a three-dimensional (3D) surface image model of the termination endface. After the 3D surface image model has been constructed, then the desired parameter is determined by visually examining the image on a display and by making estimations and calculations. A commercially available apparatus for performing the foregoing methodology is called a WYKO Topological Measurement System, which is manufactured by WYKO, Inc., U.S.A. However, this technique would require sampling and measurement of numerous image planes for construction of the 3D surface image, resulting in a computationally intensive operation that is again time consuming. Hence, the preferred embodiment is much more desirable.

As another example of a variation, it is possible to collectively implement the inspection subsystems 11, 15, 17, 19 via a single scope that has an interferometer connected to a machine vision system in a computer. In this implementation, the computer would run each of the programs, as described and output the return loss.

Finally, in the claims hereafter, the structures, materials, acts, and equivalents of all means-plus-function elements and all step-plus-function elements are intended to include any and all structures, materials, or acts for performing the specified functions.

Wherefore, the following is claimed:

1. A method for determining return loss of an optical fiber connector having a domed combination of an optical fiber and a surrounding support ferrule, the method comprising the steps of:

(a) determining an undercut/protrusion parameter corresponding with an offset of said fiber relative to a curvature of said ferrule along an axis of said fiber;

(b) determining a dome polish eccentricity parameter corresponding with a displacement in a plane perpendicular to said axis, said displacement being between a curvature center of said curvature and a fiber center of said fiber in said plane;

(c) determining a curvature radius parameter corresponding with a radius of said curvature relative to said curvature center;

(d) determining a discontinuity parameter to quantify surface discontinuities in said fiber; and (e) determining a return loss of said connector based upon said parameters.

2. The method of claim 1, wherein said steps (a) through (e) are performed without contact with said fiber.

3. The method of claim 1, wherein said steps (a) through (e) are performed automatically by a computer based system.

4. The method of claim 1, further comprising the step of generating a class that corresponds to said return loss, said class identifying one of three ranges, a first range representing a return loss of less than about 40 decibels, a second range representing a return loss of between 50 and 60 decibels, and a third range representing greater than about 60 decibels.

5. The method of claim 1, wherein step (a) comprises the steps of:

(1) imaging an endface of said connector with an interferometric fringe disposed over said fiber and over said ferrule; and (2) determining said undercut/protrusion parameter based upon an offset of said fringe between said fiber image region and ferrule image region.

6. The method of claim 1, wherein step (b) comprises the steps of:
   (1) imaging said endface with an interferometric fringe disposed over said ferrule and about said fiber;
   (2) identifying a fiber center of said fiber;
   (3) fitting an equation to said fringe;
   (4) identifying a fringe center based upon said equation; and
   (5) determining said dome polish eccentricity based upon an offset between said fiber center and said fringe center.

7. The method of claim 1, wherein step (c) comprises the steps of:
   (1) imaging said endface with an interferometric fringe disposed over said ferrule and about said fiber;
   (2) determining a spacing between fringes; and
   (3) determining said curvature radius based upon said spacing and a wavelength of light that is utilized to create said interferometric fringe.

8. The method of claim 1, wherein step (d) comprises the steps of:
   (1) imaging said fiber;
   (2) locating discontinuities in said fiber by evaluating pixel intensities;
   (3) determining weights for said discontinuities based upon locations of said discontinuities relative to a center of said fiber; and
   (4) determining said discontinuity parameter based upon said weights.

9. The method of claim 1, wherein step (e) comprises the steps of:
   determining whether each of said parameters falls within a respective predefined range;
   indicating an unacceptable return loss when one of said parameters falls outside its respective predefined range; and
   combining said parameters when all of said parameters fall within their respective predefined ranges to identify said return loss.

10. The method of claim 9, further comprising the step of using one or more lookup tables in said combining step to identify said return loss.

11. The method of claim 9, further comprising the step of using one or more equations in said combining step to identify said return loss.

12. A method for contactlessly and automatically determining return loss of an optical fiber connector having a domed combination of an optical fiber and a surrounding support ferrule, the method comprising the steps of:
   (a) determining an undercut/protrusion parameter by:
      (1) imaging an endface of said connector with an interferometric fringe disposed over said fiber and over said ferrule; and
      (2) determining said undercut/protrusion parameter based upon an offset of said fringe between said fiber image region and ferrule image region;
   (b) determining a dome polish eccentricity parameter by:
      (1) imaging said endface with an interferometric fringe disposed over said ferrule and about said fiber;
      (2) identifying a fiber center of said fiber;
      (3) fitting an equation to said fringe;
      (4) identifying a fringe center based upon said equation; and
      (5) determining said dome polish eccentricity based upon an offset between said fiber center and said fringe center;
   (c) determining a curvature radius parameter by:
      (1) imaging said endface with an interferometric fringe disposed over said ferrule and about said fiber;
      (2) determining a spacing between fringes; and
      (3) determining said curvature radius based upon said spacing and a wavelength of light that is utilized to create said interferometric fringe;
   (d) determining a discontinuity parameter by:
      (1) imaging said fiber;
      (2) locating discontinuities in said fiber by evaluating pixel intensities;
      (3) determining weights for said discontinuities based upon locations of said discontinuities relative to a center of said fiber; and
      (4) determining said discontinuity parameter based upon said weights; and
   (e) determining a return loss based upon said parameters.

13. A return loss determination system for contactlessly and automatically determining a return loss of an optical fiber connector having a domed combination of an optical fiber and a surrounding support ferrule, the system comprising:
   an undercut/protrusion (U/P) inspection mechanism for determining an U/P parameter corresponding with an offset of said fiber relative to a curvature of said ferrule along an axis of said fiber;
   a dome polish eccentricity (DPE) inspection mechanism for determining a DPE parameter corresponding with a displacement in a plane perpendicular to said axis between a curvature center of said curvature and a fiber center of said fiber;
   a curvature radius (CR) inspection mechanism for determining a CR parameter corresponding with a radius of said curvature relative to said curvature center;
   a discontinuity (D) inspection mechanism for determining a D parameter to quantify surface discontinuities in said fiber; and
   a return loss evaluation mechanism for determining a return loss of said connector based upon said parameters.

14. The system of claim 13, further comprising a means for determining one of three return loss classes from said return loss, a first class representing a return loss of less than about 45 decibels, a second class representing a return loss of between 48 and 53 decibels, and a third class representing a return loss of greater than about 55 decibels.

15. The system of claim 13, wherein said U/P inspection mechanism comprises:
   (1) a scope with a first interferometer;
   (2) a camera coupled to said interferometer; and
   (3) a machine vision system connected to said camera for receiving a image of said domed combination, said machine vision system configured to determine said disparity based upon an offset between said fringe in a fiber image region representing said fiber and said fringe in a ferrule image region representing said ferrule.

16. The system of claim 13, wherein said DPE inspection mechanism comprises:
   (1) a scope with a second interferometer;

(2) a camera connected to said scope;

(3) a machine vision system for receiving an image of said domed combination, said machine vision system configured to identify a fiber center of said fiber, to fit an equation to said fringe, to identify a fringe center based upon said equation, and to determine said DPE parameter based upon a displacement between said fiber center and said fringe center.

17. The system of claim 13, wherein said curvature radius inspection mechanism comprises:

(1) a scope with a third interferometer;

(2) a camera connected to said scope; and (3) a machine vision system for receiving an image of said domed combination, said machine vision system configured to determine a spacing between fringes and to determine said curvature radius based upon said spacing.

18. The system of claim 13, wherein said discontinuity inspection mechanism comprises:

(1) a scope;

(2) a camera connected to said scope;

(3) a machine vision system for receiving a image of said domed combination, said machine vision system configured to locate a discontinuity in said endface from said image by scanning through pixel intensities in said image, configured to weight said discontinuity based upon a location of said discontinuity relative to a center of said endface, and configured to determine said D parameter based upon said weight.

19. The system of claim 13, wherein said return loss evaluation mechanism comprises:

(1) an U/P range analysis mechanism for determining whether said U/P parameter falls within a predefined U/P range, said U/P range analysis mechanism for indicating an unacceptable return loss when said U/P parameter falls outside said predefined U/P range;

(2) a DPE range analysis mechanism for determining whether said DPE parameter falls within a predefined DPE range, said DPE range analysis mechanism for indicating an unacceptable return loss when said DPE parameter falls outside said predefined DPE range;

(3) a curvature radius range analysis mechanism for determining whether said curvature radius parameter falls within a predefined curvature radius range, said curvature radius range analysis mechanism for indicating an unacceptable return loss when said curvature radius meter falls outside said predefined curvature radius range;

(4) a discontinuity range analysis mechanism for determining whether said discontinuity parameter falls within a predefined discontinuity range, said discontinuity range analysis mechanism for indicating an unacceptable return loss when said discontinuity parameter falls outside said predefined discontinuity range; and (5) an assimilation mechanism configured to combine said parameters when all of said parameters fall within said ranges to identify said return loss.

20. The system of claim 19, wherein said assimilation mechanism is implemented with one or more lookup tables.

21. The system of claim 19, wherein said assimilation mechanism is implemented with one or more equations.

22. A return loss determination system for contactlessly and automatically determining return loss of an optical fiber connector having a domed combination of an optical fiber and a surrounding support ferrule, the system comprising:

(a) an undercut/protrusion (U/P) inspection system for determining an U/P parameter corresponding with a disparity of said fiber relative to a curvature of said ferrule along an axis of said fiber, said U/P inspection system comprising:
(1) a first scope with a first interferometer;
(2) a camera coupled to said interferometer; and
(3) a first machine vision system connected to said camera for receiving a first image of said domed combination, said machine vision system configured to determine said disparity based upon an offset between said fringe in a fiber image region representing said fiber and said fringe in a ferrule image region representing said ferrule;

(b) a dome polish eccentricity (DPE) inspection system for determining a DPE parameter corresponding with a displacement in a plane perpendicular to said axis between a curvature center of said curvature and a fiber center of said fiber, said DPE inspection system comprising:
(1) a second scope with a second interferometer;
(2) a camera connected to said second scope;
(3) a second machine vision system for receiving a second image of said domed combination, said machine vision system configured to identify a fiber center of said fiber, to fit an equation to said fringe, to identify a fringe center based upon said equation, and to determine said DPE parameter based upon a displacement between said fiber center and said fringe center;

(c) a curvature radius (CR) inspection system for determining a CR parameter corresponding with a radius of said curvature relative to said curvature center, said CR inspection system comprising:
(1) a third scope with a third interferometer;
(2) a camera connected to said third scope;
(3) a third machine vision system for receiving a third image of said domed combination, said machine vision system configured to determine a spacing between fringes and to determine said CR parameter based upon said spacing;

(d) a discontinuity inspection system for determining a discontinuity parameter to quantify surface discontinuities in said fiber, said discontinuity inspection system comprising:
(1) a fourth scope;
(2) a camera connected to said fourth scope;
(3) a fourth machine vision system for receiving a fourth image of said domed combination, said machine vision system configured to locate a discontinuity in said endface from said image by scanning through pixel intensifies in said image, configured to weight said discontinuity based upon a location of said discontinuity relative to a center of said endface, and configured to determine said DPE parameter based upon said weight; and (e) return loss evaluation system connected to said first through fourth machine vision systems, said return loss evaluation system configured to determine a return loss of said connector based upon said parameters.

23. The system of claim 22, wherein said return loss evaluation system comprises:

(1) an U/P range analysis mechanism for determining whether said U/P parameter falls within a predefined U/P range, said U/P range analysis mechanism for indicating an unacceptable return loss when said U/P parameter falls outside said predefined U/P range;

(2) a DPE range analysis mechanism for determining whether said DPE parameter falls within a predefined DPE range, said DPE range analysis mechanism for indicating an unacceptable return loss when said DPE parameter falls outside said predefined DPE range;

(3) a CR range analysis mechanism for determining whether said CR parameter falls within a predefined CR range, said CR range analysis mechanism for indicating an unacceptable return loss when said CR parameter falls outside said predefined CR range;

(4) a discontinuity range analysis mechanism for determining whether said discontinuity parameter falls within a predefined discontinuity range, said discontinuity range analysis mechanism for indicating an unacceptable return loss when said discontinuity parameter falls outside said predefined discontinuity range; and (5) an assimilation mechanism configured to combine said parameters when all of said parameters fall within said ranges to identify said return loss.

24. The system of claim 23, wherein said assimilation mechanism is implemented with one or more lookup tables.

25. The system of claim 23, wherein said assimilation mechanism is implemented with one or more equations.

* * * * *